US008085491B2

(12) United States Patent
Antoku et al.

(10) Patent No.: US 8,085,491 B2
(45) Date of Patent: Dec. 27, 2011

(54) METHOD OF DETERMINING FLYING HEIGHT OF MAGNETIC HEAD

(75) Inventors: Yosuke Antoku, Tokyo (JP); Noboru Yamanaka, Tokyo (JP); Masashi Sano, Tokyo (JP); Kosuke Tanaka, Tokyo (JP); Man Tse, Hong Kong (CN); Eric Cheuk Wing Leung, Hong Kong (CN); Luke Hung Leung Chung, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 12/659,129

(22) Filed: Feb. 26, 2010

(65) Prior Publication Data

US 2011/0211275 A1 Sep. 1, 2011

(51) Int. Cl.
*G11B 2/21* (2006.01)
(52) U.S. Cl. .......................................... 360/75
(58) Field of Classification Search ............... None
See application file for complete search history.

(56) References Cited

U.S. PATENT DOCUMENTS

| 5,130,866 | A | 7/1992 | Klaassen et al. | |
| 7,388,726 | B1 * | 6/2008 | McKenzie et al. | 360/75 |
| 7,589,928 | B2 | 9/2009 | Roy et al. | |
| 7,787,207 | B2 * | 8/2010 | Takahashi | 360/75 |
| 2008/0007871 | A1 | 1/2008 | Kiyono et al. | |
| 2008/0043355 | A1 | 2/2008 | Ota | |
| 2008/0094755 | A1 | 4/2008 | Ota et al. | |

FOREIGN PATENT DOCUMENTS

JP A-2008-077751 4/2008

OTHER PUBLICATIONS

Kenichiro Aoki and Toru Watanabe "Nonlinearity of Thermal Spacing Control in Hard Disk Drives," *IEEE Transactions of Magnetics*, vol. 45, No. 2, Feb. 2009, pp. 816-821.
C. Dennis Mee and Eric D. Daniel, *Magnetic Recording Technology Second Edition*, pp. 1.12-1.14, Mar. 1996.

* cited by examiner

*Primary Examiner* — K. Wong
(74) *Attorney, Agent, or Firm* — Posz Law Group, PLC

(57) ABSTRACT

For obtaining a flying height of a magnetic head from a magnetic disk, the magnetic head being placed in a slider arranged at an interval with the magnetic disk, an initial setting process and a flying height detecting process are performed. In the initial setting process, driving power to a heater is increased gradually, from a state where the heater arranged at a position in proximity to the magnetic head in the slider is not driven, until the magnetic head makes contact with the magnetic disk. Then, in each stage, an electrical resistance value of the sensor arranged at a position in proximity to the magnetic head in the slider, which is increased due to the heat from heater, and either an approach distance of the magnetic head toward the magnetic disk or the flying height of the magnetic head from the magnetic disk are acquired. Then, basic data is prepared by obtaining the relationship between a variation of the electrical resistance value of the sensor and the flying height of the magnetic head from the magnetic disk, which is obtained in each stage or which calculated from the approach distance in each stage. In the flying height detecting process, an electrical resistance value of the sensor is determined, and a variation of the electrical resistance value is calculated from the determined values. Then, the flying height of the magnetic head from the magnetic disk in the state where the electrical resistance value was determined is obtained based on the basic data obtained in the initial setting process, using the calculated variation of the electrical resistance value.

7 Claims, 13 Drawing Sheets

METHOD OF DETERMINING FLYING HEIGHT OF MAGNETIC HEAD

BACKGROUND OF THE INVENTION

1. Field of the Invention

The present invention relates to a method for determining the flying height of a magnetic head used for writing information to a magnetic disk and/or reading information from a magnetic disk, and a method for controlling the flight of a magnetic head.

2. Description of the Related Art

A magnetic head, such as a hard disk device, is arranged at an interval relative to a surface of the rotating magnetic disk, and information is written to the magnetic disk and/or is read from the magnetic disk. Recently, in association with high density recording on a magnetic disk, the interval between the magnetic head and the surface of the magnetic disk (a flying height of the magnetic head) is extremely small, and is set at, for example, 10 nm or less. When the flying height of the magnetic head is very small in such case, if the flying height of the magnetic head varies for some reason, there is a possibility that the magnetic head may make contact with the surface of the magnetic disk and that the magnetic head may be damaged. Therefore, in order to control the magnetic head so as not to make contact with the magnetic disk, it is desirable to obtain the flying height of the magnetic head.

In the method described in U.S. Pat. No. 5,130,866, the reading output (read back signal) is obtained by reading data signals (magnetic transition) pre-written at a pre-selected position on a magnetic disk by a magnetic head. The reading outputs are obtained under two conditions with different flying heights of the magnetic head, respectively, and the difference in the flying height of the magnetic head under the two conditions can be obtained by using the known Wallace equation (described hereafter).

In this case, the difference in the flying height (a relative value) can be obtained between the two conditions with different flying heights of the magnetic head. However, the flying height (an absolute value) of the magnetic head, i.e., the interval itself between the magnetic head and the surface of the magnetic disk cannot be directly obtained. In order to obtain the flying height of the magnetic head under specific conditions, i.e., the interval between the magnetic head and the surface of the magnetic disk, first, the reading output under the specified condition is obtained. Then, the magnetic head is intentionally brought into contact with the surface of the magnetic head, and the reading output is obtained under contact conditions. This enables comparison between the condition where the flying height should be determined and the condition where the flying height of the magnetic head is zero. As a result, the flying height to be determined can be acquired.

Even in the inventions described in U.S. Pat. No. 7,589,928 and US Patent Laid-Open Publication No. 2008/94755, a magnetic head is brought into contact with the surface of a magnetic disk and the reading output is obtained, and the flying height of the magnetic head can be acquired by comparing the reading output obtained under the contact condition with the reading output in the condition where the flying height should be detected.

These methods all use a technique for obtaining the difference in the flying height of the magnetic head under two conditions. Therefore, in order to obtain the flying height of the magnetic head under a particular condition, it is necessary to acquire the reading output under the condition where the magnetic head is brought into contact with the surface of the magnetic disk. This means that the magnetic head collides with the magnetic head every time the flying height is obtained, and there is a risk of damaging the magnetic head and the magnetic disk.

Further, in these methods, the flying height of the magnetic head is calculated based on the reading output of pre-written data signals. Therefore, the magnetic head must have a reproductive element part (reading part), and when obtaining the flying height, it is necessary to activate the reproductive element part. Then, in the case of adopting these methods, it is necessary to write a predetermined data signal into a predetermined position on the magnetic disk. The reasons are because there is a possibility where the flying height based on the reading output may not be accurately calculated if the details of the data signal are unknown, and the data signal cannot be easily read by the reproductive element part if a writing position of the data signal is unknown. Thus, a specific region (contact lane) to be used for acquiring the flying height must be established and a specific data signal must be written. In the case of using a general magnetic disk not having such a specific region and specific data signal, the flying height of the magnetic head cannot be acquired and the magnetic head cannot be controlled so as not to come into contact with the surface of the magnetic disk.

In US Patent Laid-Open Publication No. 2008/007871, a sensor for detecting contact of a magnetic head with a magnetic disk is disclosed. Specifically, an acoustic emission sensor or a thermal asperity effect element sensor is arranged on an air bearing surface of a slider including the magnetic head. The sensor detects contact between the magnetic head and the magnetic disk based on the friction when the magnetic head makes contact with the magnetic disk. Although such a sensor is broadly adopted to a common magnetic head, it cannot prevent the magnetic head from making contact with the magnetic disk before such contact occurs, and the sensor does not have the effect of preventing breakage of the magnetic head.

In US Patent Laid-Open Publication No. 2008/0043355, US Patent Publication No. 2008/94755, US Patent Publication No. 2008/007871 and Japanese Unexamined Patent Application Publication 2008-77751, methods for approximating the distance of a magnetic head to a surface of a magnetic disk by thermally expanding at least a portion of a slider by driving a heater placed in a slider where a magnetic head is formed for generating heat are described. In this case, it is possible to minutely adjust the flying height of the magnetic head by adjusting the driving power of the heater. The heater (heat-generating resistor) in Japanese Unexamined Patent Application Publication 2008-77751 also functions as a sensor for detecting collision of the magnetic head against the magnetic disk.

In U.S. Pat. No. 7,589,928, a system having a magnetic device for writing to a magnetic medium and reading from the magnetic medium, and a sensor arranged adjacent to the magnetic device so as to be close to the magnetic medium is disclosed. The sensor generates a signal relating to a change in heat within the sensor, which is generated due to a change of the interval between the magnetic device and the magnetic medium.

SUMMARY OF THE INVENTION

The objective of the present invention is to provide a method of determining (measuring) the flying height of a magnetic head and a method for controlling the flight of the magnetic head so that the magnetic head does not have to be brought into contact with a magnetic disk every time the flying height is acquired and contact between the magnetic head and the magnetic disk can be easily avoided.

The method of determining the flying height of the magnetic head from the magnetic disk, the magnetic head being placed in a slider arranged at an interval with the magnetic disk, includes an initial setting process and a flying height detecting process. In the initial setting process, driving power to a heater is increased gradually, from a state where the heater arranged at a position in proximity to the magnetic head in the slider is not driven, until the magnetic head makes contact with the magnetic disk. Then, in each stage, an electrical resistance value of the sensor arranged at a position in proximity to the magnetic head in the slider, which is increased due to the heat from heater, and either an approach distance of the magnetic head toward the magnetic disk or the flying height of the magnetic head from the magnetic disk are acquired. Then, basic data is prepared by obtaining the relationship between a variation of the electrical resistance value of the sensor and the flying height of the magnetic head from the magnetic disk. At this time, when the approach distance of the magnetic head toward the magnetic disk is obtained in each stage, the approach distance is converted so that the flying height in each stage is obtained. In the flying height detecting process, an electrical resistance value of the sensor is determined, and a variation of the electrical resistance value is calculated from the determined values. Then, the flying height of the magnetic head from the magnetic disk in the state where the electrical resistance value was determined is obtained based on the basic data obtained in the initial setting process, using the calculated variation of the electrical resistance value.

The objectives, characteristics and advantages of the present invention, and other objectives, characteristics and advantages will be clarified by reading the explanation hereafter with reference to attached drawings showing an embodiment of the present invention.

DESCRIPTION OF THE PREFERRED EMBODIMENTS

Embodiments of the present invention are explained hereafter with reference to the drawings.

Figure 1A:
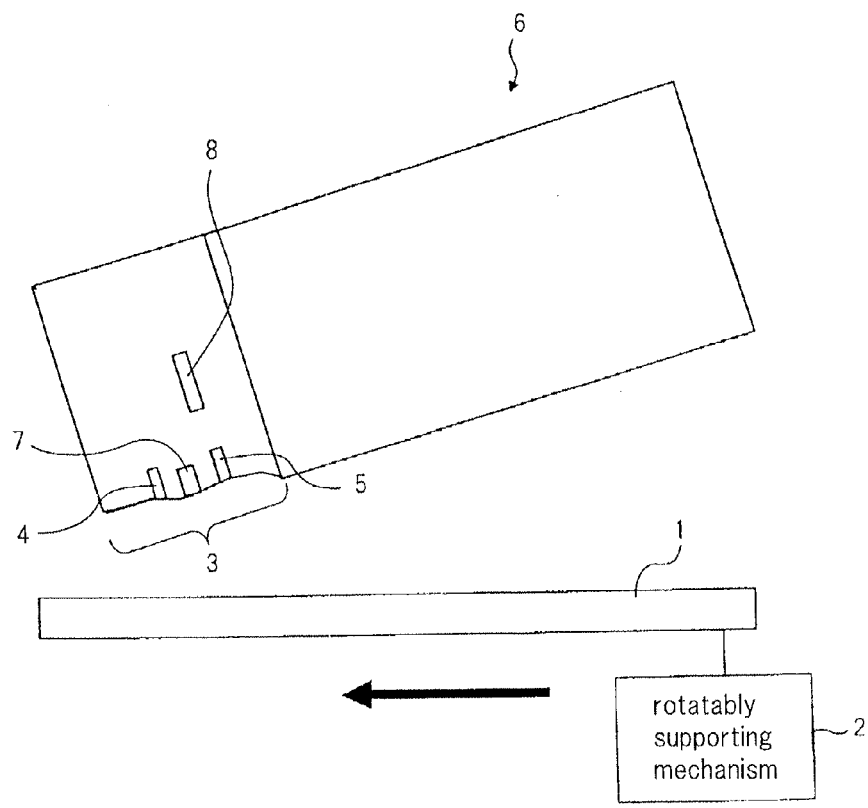
FIG. 1A is a schematic view of main parts of a hard disk device in one embodiment of the present invention showing a state where a heater is not driven.
Figure 1B:
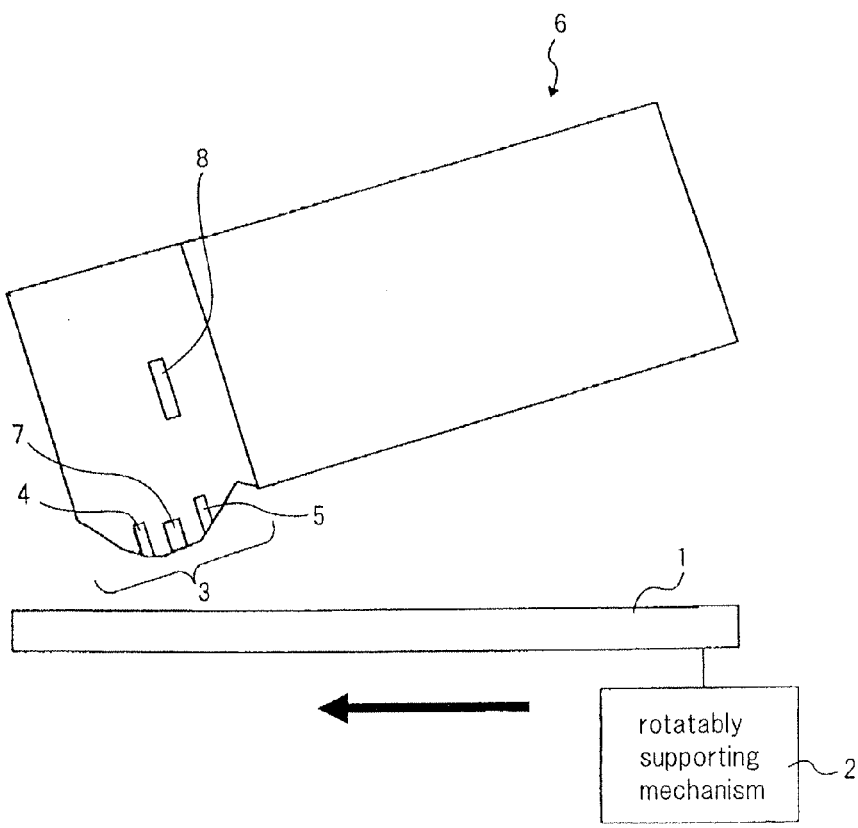
FIG. 1B is a schematic view of main parts of a hard disk device in one embodiment of the present invention showing a state where a heater is driven.

FIGS. 1A and 1B are schematic views showing the main parts of a hard disk device, which is one example of a device where the present invention is applied. This hard disk device includes a rotatably supporting mechanism 2 for rotatably supporting a magnetic disk (hard disk) 1, and a slider 6 arranged at a position facing the rotatably supporting mechanism 2. A magnetic head 3 has a recording element part (writing part) 4, a reproductive element part (reading part) 5, a sensor 7, and a heater 8. Magnetic information can be written from the recording element part 4 of the magnetic head 3 to the magnetic disk 1, which is supported and rotated by the rotatably supporting mechanism 2, and magnetic information recorded on the magnetic disk 1 can be read by the reproductive element part 5 of the magnetic head 3.

The sensor 7 of the magnetic head 3 is established separately from the reproductive element part 5, and as similar to a thermal asperity effect element sensor described in US Patent Laid-Open Publication No. 2008/007871, an internal electrical resistance value of the sensor 7 can be measured. At least a portion of the sensor 7 is exposed, and any contact between the magnetic head 3 and the surface of the magnetic disk is detectable. A variation dR of the electrical resistance value determined by the sensor 7 is used for obtaining the flying height SP of the magnetic head 3 as described later. Material of the sensor 7 is selected from NiFe, αTa, W, Ti, and the like, and its electrical resistance value is within the range of approximately 30Ω to approximately 1 kΩ.

The heater 8 of the magnetic head 3 can expand at least a portion of slider 6 by generating heat and can approximate the magnetic head 3 to the magnetic disk 1 in a manner similar to the heaters described in US Patent Laid-Open Publication No. 2008/0043355, US Patent Laid-Open Publication No. 2008/94755 and US Patent Laid-Open Publication No. 2008/007871. FIG. 1A shows the positional relationship between slider 6 and the magnetic disk 1 in the state where the heater 8 is not driven, and FIG. 1B shows the positional relationship between slider 6 and the magnetic disk 1 in the state where the heater 8 is driven and the magnetic head 3 is in proximity to the magnetic disk 1. A detailed configuration of a head gimbal assembly 220 including the magnetic head 3 and slider 6 will be described later.

This embodiment relates to a method for obtaining the flying height SP of the magnetic head 3, i.e., the interval between the magnetic head 3 and the surface of the magnetic disk 1 supported by the rotatably supporting mechanism 2.

Herein, a basic technical concept of the present invention is explained. An objective of the present invention is to eliminate the necessity of bringing the magnetic head into contact with the surface of the magnetic disk every time the flying height SP of the magnetic head from the magnetic disk is obtained as in the prior art. In addition, the present invention enables the flying height SP from the magnetic disk 1 to be obtained during use of the magnetic head 3 without bringing the magnetic head 3 into contact with the surface of the magnetic disk 1. In order to realize this, in the present invention, as the initial setting process, the relationship between the variation dR of the electrical resistance value of the sensor 7 placed in the magnetic head 3 and the flying height SP of the magnetic head 3 from the magnetic disk 1 is obtained, and the relationship is stored as basic data. Then, when the magnetic head 3 is used, the electrical resistance value R of the sensor 7 is constantly or intermittently determined, and the flying height SP of the magnetic head 3 corresponding to the variation dR of the electrical resistance value is obtained based on the basic data obtained and stored during the initial setting process (referred to as "flying height detecting process"). Furthermore, the sensor 7 may be a sensor for detecting contact between the magnetic head and the surface of the magnetic disk, which has been conventionally established in many magnetic heads.

Conventionally, the flying height SP of the magnetic head is obtained based on the known Wallace equation (described later) by using the reading output (a read back signal) by the reproductive element part 5. In the present invention, in the initial setting process that should be performed only once, as is similar to the prior art, it is possible to use the reading output by the reproductive element part 5 and the Wallace equation. However, in the flying height detecting process, both the reading output by the reproductive element part 5 and the Wallace equation are not used, but the flying height SP of the magnetic head 3 is obtained by using only the variation dR of the actual electrical resistance value R measured by the sensor 7 and the basic data obtained during the initial setting process. Therefore, in the flying height detecting process, it is unnecessary to obtain a reading output, and it is unnecessary for the reproductive element 5 to be activated for obtaining the flying height SP. This means that the reproductive element part 5 can perform only its original function, i.e., can read information written on the magnetic disk 1 even during the flying height detecting process. In other words, even while the magnetic head 3 is reading information written on the magnetic disk 1, the flying height SP can be obtained in parallel. It was impossible in the prior art to work in parallel. Furthermore, if it is possible to obtain the flying height SP of the magnetic head 3 using any method other than the conventional method using the reading output by the reproductive element part 3 and the Wallace equation, it is unnecessary to obtain the reading output by the reproductive element part 5 even during the initial setting process.

The principle of obtaining the flying height SP of the magnetic head 3 as described above is explained in detail. Normally, the flying height SP of the magnetic head 3 is adjusted by driving the heater 8 placed within the magnetic head 3 for controlling a degree of thermal expansion of the slider 6 where the magnetic head 3 is placed. In other words, if the thermal expansion volume of the slider 6 due to heating of the heater 8 is great, the magnetic head 3 at the end of slider 6 comes closer to the magnetic disk 1 (the flying height SP decreases). If the thermal expansion volume of the slider 6 is small, the magnetic head 3 at the end of the slider 6 does not come close to the magnetic disk 1 (the flying height SP becomes great). As described above, the sensor 7 is often conventionally used for the purpose of detecting contact between the magnetic head 3 and the surface of the magnetic disk 1, and the temperature of the sensor 7 also increases at the time of heating the heater 8. Since the electrical resistance value R of metal increases in association with an increase in temperature, the electrical resistance value R of the sensor 7 also increases in association with the temperature increase due to heating of the heater 8. In other words, if the flying height SP of the magnetic head 3 decreases in association with the heating of the heater 8, the electrical resistance value R of the sensor 7 simultaneously increases. Then, in the present invention, the electrical resistance value R of the sensor 7 is determined, and the flying height SP of the magnetic head 3 is obtained based on the determined values.

Figure 2:
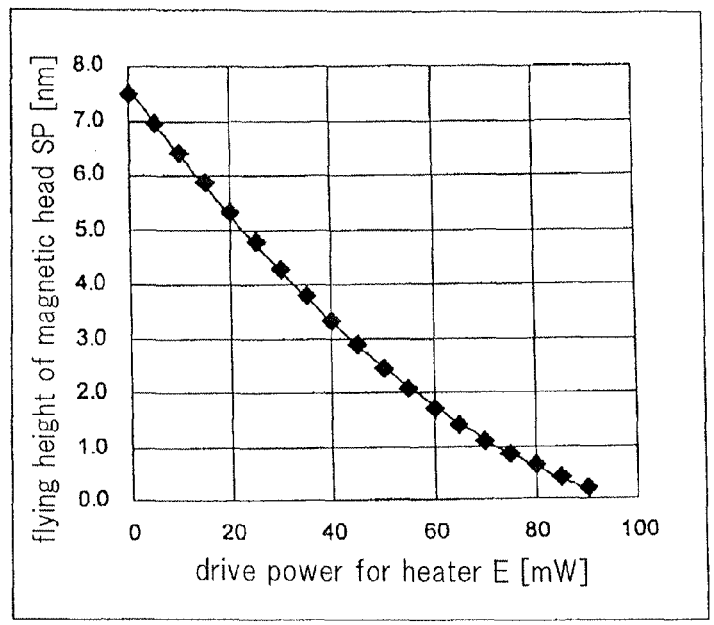
FIG. 2 is a graph showing the relationship between driving power of the heater and the flying height of the magnetic head.
Figure 3:
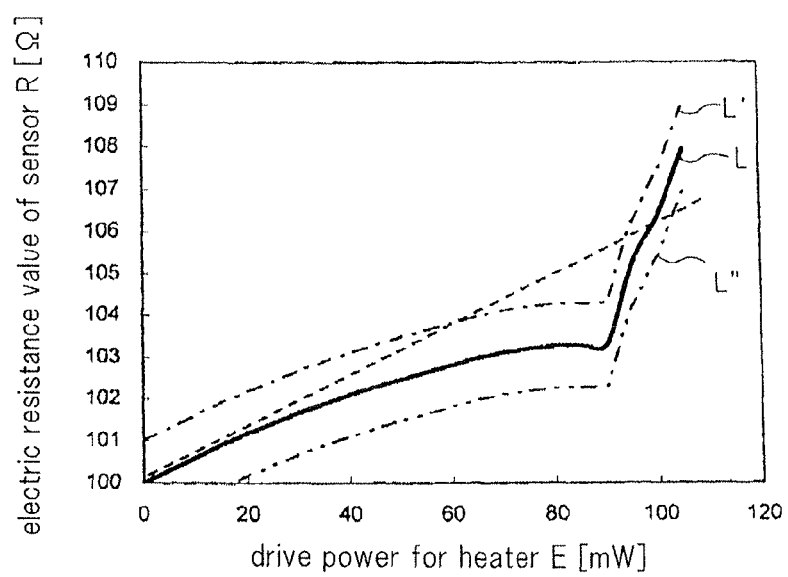
FIG. 3 is a graph showing the relationship between driving power of the heater and an electrical resistance value of the sensor.

The relationship between the driving power E of the heater 8 and the flying height SP of the magnetic head 3 (the interval between the magnetic head 3 and the magnetic disk 1) is shown in FIG. 2. As is obvious from FIG. 2, the flying height SP of the magnetic head 3 is reduced substantially in a linear relationship in association with the increase in the driving power E of the heater 8. The relationship between the driving power E of the heater 8 and the electrical resistance value R of the sensor 7 is shown in FIG. 3. According to FIG. 3, the electrical resistance value R of the sensor 7 is increased substantially in a linear relationship in association with the increase in the driving power E of the heater 8 within the range where the driving power E of the heater 8 is small (a range less than approximately 30 [mW] in the example of FIG. 3). However, when the driving power E of the heater 8 becomes great (becomes approximately 30 [mW] in the example of FIG. 3), the increase of the electrical resistance value R of the sensor 7 gradually becomes moderate. Then, when the driving power E of the heater 8 is further increased and reaches a specified level (approximately 90 [mW] in the example of FIG. 3), the electrical resistance value R of the sensor 7 drastically increases. As described above, it is disclosed in the paper "Nonlinearity of Thermal Spacing Control in Hard Disk Drives," IEEE TRANSACTIONS ON MAGNETICS, VOL. 45, NO. 2, FEBRUARY 2009, Kenichiro Aoki and Toru Watanabe, that the increase of the driving power E of the heater 8 and the increase of the electrical resistance value R of the sensor 7 partially become, nonlinear, (no connection to a linear relationship shown with a broken line).

The reason the driving power E of the heater 8 and the electrical resistance value R of the sensor 7 become nonlinear is described hereafter. When the driving power E of the heater 8 becomes approximately 30 [mW], the flying height SP of the magnetic head 3 becomes approximately 4 [nm] (see FIG. 2), and the magnetic head 3 is in a state where it is considerably closer to the magnetic disk 1. If the magnetic head 3 comes close to the magnetic disk 1 as described above, air turbulence generated by the rotating magnetic disk 1 effectively cools the sensor 7. In other words, the rotating magnetic disk 1 acts as an air cooling means to the sensor 7. Therefore, when the driving power E of the heater 8 becomes approximately 30 [mW] or greater and the magnetic head 3 comes considerably closer to the magnetic disk 1, the temperature increase of the sensor 7 becomes moderate, and the increase of the electrical resistance value R of the sensor 7 becomes moderate. Since the heater 8 is in a position where no air turbulence is received from the rotating magnetic disk 1, the thermal expansion of the slider 6 due to heat generation of the heater 8 cannot be prevented. When the driving power E of the heater 8 becomes approximately 90 [mW], the flying height SP of the magnetic head 3 becomes 0 [nm], i.e., the magnetic head 3 makes contact with the magnetic disk 1. In that case, the temperature of the magnetic head 3 drastically increases due to frictional heat generated between the magnetic head 3 and the magnetic disk 1, and the electrical resistance value R of the sensor 7 drastically increases. Furthermore, the relationship between the driving power E of the heater 8 and the electrical resistance value R of the sensor 7 as shown in FIG. 3 appears to be invertible and reproducible with the same device under the same conditions.

Figure 4:
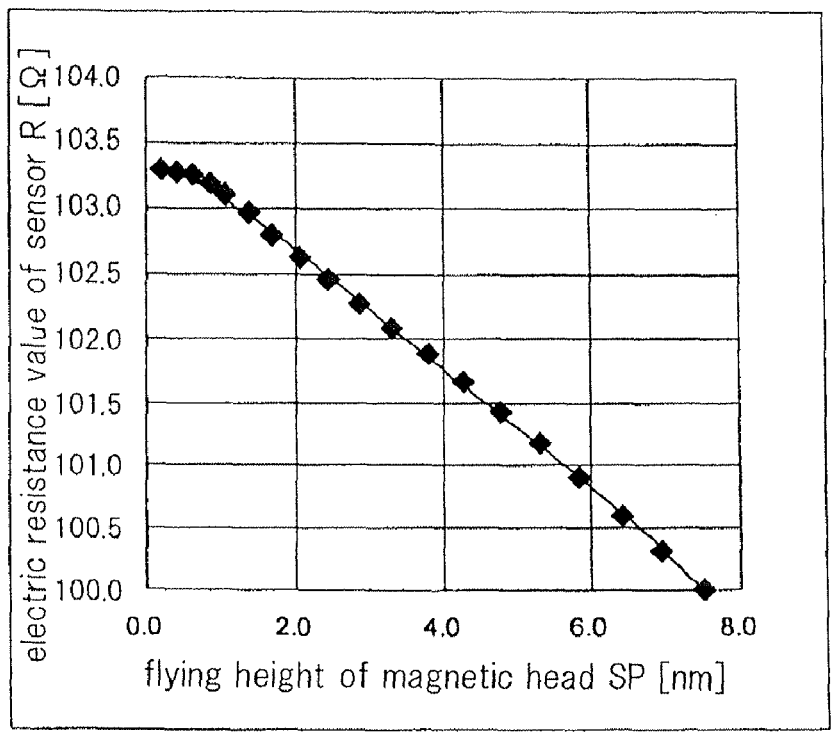
FIG. 4 is a graph showing the relationship between an electrical resistance value of the sensor and the flying height of the magnetic head.

In the present invention, the flying height SP of the magnetic head 3 in the state immediately before the magnetic head 3 makes contact with the magnetic disk 1 is obtained. This is because it is believed that it is particularly important to obtain and monitor the flying height SP of the magnetic head 3 is mainly in the state in which the magnetic head 3 comes considerably closer to the magnetic disk 1 but does not make any contact with the magnetic disk 1. In the state before the magnetic head 3 makes contact with the magnetic disk 1 (the driving power E is within the range of 30 [mW] to 90 [mW] in the example shown in FIG. 3), the driving power E of the heater 8 and the electrical resistance value R of the sensor 7 are in a nonlinear relationship. In a nonlinear relationship, it is difficult to determine the electrical resistance value R of the sensor 7 and to obtain the flying height SP of the magnetic head 3 based on the determined values. According to the graph in FIG. 4 showing the relationship between the electrical resistance value R of the sensor 7 and the flying height SP of the magnetic head 3 obtained based on the graph in FIG. 2 and the graph in FIG. 3, dots thicken in the range where the flying height SP is close to 0. This means that the resistance value R (103Ω to approximately 103.3Ω) of the sensor 7 hardly changes even if the driving power E of the heater 8 is changed. Therefore, in this FIG. 4, it cannot be stated that the electrical resistance value R and the flying height SP are in a one-to-one correspondence relationship within the range where the flying height SP is close to 0, and it is difficult to accurately specify the flying height SP corresponding to a specified electrical resistance value R.

In the present invention, not the electrical resistance value R itself of the sensor 7 but the flying height SP of the magnetic head 3 is obtained based on the variation dR of the electrical resistance value. For this purpose, based on the graph in FIG. 4, the relationship between the variation of the electrical resistance value of the sensor 7 (herein, the variation of the electrical resistance value when the driving power of the heater 8 is increased by 10 [mW]) dR and the flying height SP of the magnetic head is obtained (see FIG. 5). According to FIG. 5, immediately before the magnetic head 3 makes contact with the surface of the magnetic disk 1 (the flying height SP is in the vicinity of 0 [nm]), the variation dR of the electrical resistance value is close to 0 [Ω]. This is consistent with the fact that the gradient of the graph is small and is substantially horizontal immediately before the electrical resistance value R drastically increases in the graph of FIG. 3. As shown in this graph of FIG. 5, the variation dR of the electrical resistance value and the flying height SP are substantially in a one-to-one correspondence relationship within the range where the flying height SP is close to 0, and the flying height SP corresponding to the specified variation dR of an electrical resistance value can be accurately identified. The variation dR of the electrical resistance value is substantially constant within the range where the flying height SP of the magnetic head 3 is comparatively great, 5 [nm] or greater, and this is not a one-to-one correspondence relationship relative to the flying height SP. However, since it is unnecessary to detect such a highly-accurate flying height SP within the range where the flying height SP is great, this is not a problem.

Another reason to obtain the flying height SP of the magnetic head 3 based on the variation dR of the electrical resistance value of the sensor 7 is explained.

When the flying height SP of the magnetic head 3 is obtained based on the electrical resistance value R of the sensor 7 by way of experiment, if the electrical resistance value R fluctuates even a little due to a change of conditions, such as environmental temperature, an error of the flying height SP becomes greater. For example, if the environmental temperature is changed, because the initial temperature of the sensor 7 is different, the relationship between the driving power E of the heater 8 and the temperature of the sensor 7 (not a temperature change but a temperature value itself) is changed. In that case, since the electrical resistance value R of the sensor 7 is determined according to the temperature, the relationship between the driving power E of the heater 8 and the electrical resistance value R of the sensor 7 is changed. This means a graph (solid line L) shown in FIG. 3 shifts in parallel without changing any form. For example, if the environmental temperature is high, the graph in FIG. 3 shifts in parallel upward (dashed line U: the electrical resistance values R become uniformly higher overall). If the environmental temperature is low, the graph of FIG. 3 shifts in parallel downward (chain double-dashed line L': the electrical resistance values R become uniformly lower overall). In these situations, if an attempt is made to obtain the flying height SP of the magnetic head 3 directly from the determined electrical resistance value R, an error occurs corresponding to the parallel shift of the graph (corresponding to the change in the relationship with the dashed line L' or the chain double-dashed line L"). Specifically, for example, when the determined electrical resistance value R of the sensor 7 is 102Ω, it is determined that the driving power E of the heater 8 is approximately 40 mW based on the solid line L of FIG. 3, and the flying height SP of the magnetic head 3 corresponding to the driving power E=40 mW (approximately 3.4 nm in the example shown in FIG. 2) is obtained. However, if the environmental temperature is high in the state expressed with the dashed line the actual driving power E of the heater 8 corresponding to the electrical resistance value R=102Ω of the sensor 7 is approximately 20 mW, and the actual flying height SP of the magnetic head 3 is a value corresponding to the driving power E=20 mW (approximately 5.3 nm in the example of FIG. 2). Inversely, when the environmental temperature is low in the state expressed with the chain double-dashed line L", the actual driving power E of the heater 8 corresponding to the electrical resistance value R=102Ω of the sensor 7 is approximately 70 mW, and the actual flying height SP of the magnetic head 3 is a value corresponding to the driving power E=70 mW (approximately 1.0 nm in the example shown in FIG. 2). As described above, if an attempt is made to directly obtain the flying height SP of the magnetic head 3 only from the determined electrical resistance value R, an error (in the example above, approximately ±2 nm of error relative to a change of approximately 1° C. of the environmental temperature) may occur.

In the meantime, in the graph shown in FIG. 3, the shapes of the curves L, L' and L" themselves are not changed, and they shift parallel in the vertical direction as mentioned above, but they do not shift in the horizontal direction. This means that the variation of the electrical resistance value (a gradient of the graph and a derivative value) dR relative to the driving power E of the heater 8, which is a horizontal axis, is the same in all of the curves L, L' and L". Then, when the driving power E of the heater 8 and the electrical resistance value R of the sensor 7 are in a nonlinear relationship (within the range of 30 [mW] to 90 [nm] of the electric power E in the example shown in FIG. 3), the gradient of the graph (derivative value), i.e., the variation dR of the electrical resistance value is continuously changed. This pattern to cause a change the gradient of the graph will not be changed even if the graph shifts in parallel, i.e., in any of the lines L, L' and L" of FIG. 3. Therefore, even if the driving power of the heater 8 corresponding to the specified variation dR of an electrical resistance value will be the same value even if it is obtained based on any of the curves L, L' and L". As a result, in the graph shown in FIG. 5, the variation dR of the electrical resistance value of the sensor 7 and the flying height SP of the magnetic head 3 are in a one-to-one correspondence relationship within the range where the flying height SP of the magnetic head 3 is close to 0, and the flying height SP corresponding to the specified variation dR of an electrical resistance value can be accurately identified.

As described above, in the present invention, when the magnetic head 3 and the magnetic disk 1 are in the state immediately before making any contact, i.e., when the driving power E of the heater 8 and the electrical resistance value R of the sensor 7 are in a nonlinear relationship (the driving power E is within the range of 30 [mW] to 90 [mW] in the example shown in FIG. 3), the flying height SP of the magnetic head 3 can be accurately obtained based on the variation dR of the determined electrical resistance value.

Furthermore, the variation dR of the electrical resistance value is not changed but is constant in the range where the electrical resistance value R of the sensor 7 and the driving power E of the heater 8 are in a linear relationship (the range where the driving power E is less than 30 [mW] in the example shown in FIG. 3, i.e., a portion in parallel with the broken line). Therefore, in that case, the variation dR of the electrical resistance value cannot be used for obtaining the flying height SP of the magnetic head. This is because the variation dR of the electrical resistance value and the flying height SP of the magnetic head 3 are not in the one-to-one correspondence relationship within the range where the electrical resistance value R and the driving power E of the heater 8 are in a linear relationship (equivalent to the range where the flying height SP=5 nm or greater in the example of FIG. 5). In this case, since the flying height SP of the magnetic head 3 is comparatively great, the necessity to detect the flying height SP is low and it appears that this is not a problem. However, when it is desired to accurately detect the flying height SP within the range, the flying height SP of the magnetic head 3 should be directly obtained from the determined electrical resistance R itself based on the relationship shown in FIG. 4. In that case, the flying height SP is obtained based on the variation dR of the determined electrical resistance value within the range where the electrical resistance value R and the driving power E of the heater 8 are in a nonlinear relationship (the range where the flying height is close to 0), and the flying height SP is obtained based on the determined electrical resistance value R itself within the range where the electrical resistance value R and the driving power E of the heater 8 are in a linear relationship (within the range where the flying height is comparatively great).

In the present invention, the above-mentioned relationship between the variation dR of the electrical resistance value of the sensor 7 and the flying height SP of the magnetic head 3 (see FIG. 5) is obtained in the initial setting process of the present invention and stored as basic data. Then, while the magnetic head 3 is actually in use, the variation dR of the electrical resistance value of the sensor 7 is constantly or intermittently obtained, and the flying height SP of the magnetic head 3 is obtained by comparing the variation dR with the basic data (the graph shown in FIG. 5). This process is referred to as the flying height detecting process in this specification.

As an example to realize the technical concept described above, a specific embodiment of the present invention is explained hereafter.

In the present embodiment, in order to obtain the relationship between the flying height SP of the magnetic head 3 and the variation dR of the electrical resistance value of the sensor 7 as the basic data for obtaining the flying height SP of the magnetic head 3 as described above, an initial setting process (see the flowchart in FIG. 6) is conducted.

Specifically, first, the electrical resistance value R of the sensor 7 and the reading output (read back signal) $V_0$ by the reproductive element part 5 are obtained in the state where the heater 8 is not driven, i.e., in the state where slider 6 is not thermally expanded (see FIG. 1A) (S1). This reading output $V_0$ is used as a reference for later calculation of the magnetic head proximity (approach distance) d when driving the heater 8 and the proximity of the magnetic head 3 to the surface of the magnetic disk 1. However, the state in which the heater 8 is not driven need not always be used as a reference, but the state where the heater 8 is driven by a specified driving power can be used as a reference. The details will be described later, but in the initial setting process, similar to the method described in U.S. Pat. No. 5,130,866, an approach distance d is obtained using the reading output (read back signal) of the reproductive element part 5.

Next, the driving power E of the heater 8 is increased by a predetermined amount (for example, 10 [mW]) (S2). At this point, 0+10=10 [mW] of the driving power is supplied to the heater 8. A portion of slider 6 is thermally expanded due to the heat generation of the driven heater 8, and the magnetic head 3 moves slightly closer to the surface of the magnetic disk 1 (see FIG. 1B). Herein, the electrical resistance value R of the sensor 7 which changes in association with the temperature increase and the reading output $V_n$ by the reproductive element part 5 are obtained (S3). When it is detected from the electrical resistance value R of the sensor 7 that the magnetic head 3 does not make contact with the surface of the magnetic disk 1 (S4), the approach distance d of the magnetic head 3 to the surface of the magnetic disk 1 (distance indicating the proximity to the magnetic disk 1) from the state where the heater 8 is not activated (the state of Step S1) (S5) is obtained. Furthermore, as described above, when the magnetic head 3 makes contact with the surface of the magnetic disk 1, the temperature of the magnetic head 3 drastically increases due to the frictional heat, and the electrical resistance value R of the sensor 7 drastically increases. Therefore, if the electrical resistance value R of the sensor 7 does not drastically increase (if the electrical resistance value R merely continues to gradually increase), it can be determined that the magnetic head 3 has not made contact with the surface of the magnetic disk 1 at Step S4.

Then, the driving power E of the heater 8 is further increased by a predetermined amount (10 [mW]) (S2). In other words, 10+10=20 [mW] of driving power E is applied to the heater 8. Then, since the magnetic head 3 comes further closer to the surface of the magnetic disk 1, the electrical resistance value R of the sensor 7 and the reading output $V_n$ by the reproductive element part 5 is obtained again (S3). If it can be confirmed that the magnetic head 3 has not yet made contact with the surface of the magnetic disk 1 (S4), the approach distance d of the magnetic head 3 to the surface of the magnetic disk 1 from the state where the heater 8 is not activated is obtained (S5).

At Step S4, Steps S2 to S5 are repeated until it is confirmed that the magnetic head 3 makes contact with the surface of the magnetic disk 1 based on the electrical resistance value R of the sensor 7 (a drastic increase of the electrical resistance value R of the sensor 7). In other words, the driving power E to the heater 8 gradually increases by a predetermined amount (10 [mW]), and the electrical resistance value R of the sensor 7 in each stage, the reading output $V_n$ by the reproductive element part 5 and the approach distance d of the magnetic head 3 to the magnetic disk 1 from the state where the heater 8 is not activated are obtained.

Herein, the approach distance d of the magnetic head 3 to the surface of the magnetic disk 1 can be calculated using the known Wallace equation. This Wallace equation is described in C. Dennis Mee, Eric D. Daniel, "Magnetic Recording Technology Second Edition," pp. 1.12-1.14, March 1996.

$$V_n/V_0 = e^{(-2\pi d/\lambda)}$$

$$d = (\lambda/2\pi)\log(V_n/V_o)$$

This Wallace equation calculates the difference of the flying height SP in two states where the flying heights SP of the magnetic head are different from each other. Specifically, the reading outputs in the two states are $V_n$ and $V_0$, respectively. The symbol $\lambda$ is a coefficient to be determined according to magnetic information to be read, and indicates a wavelength of a reproductive signal. The symbol d represents the difference of the flying height SP between the two states. Therefore, when Steps S1-S5 mentioned above are implemented, $V_n$ represents the reading output in the state where an attempt is made to obtain the approach distance d, $V_0$ represents the reading output in the state where the heater 8 is not activated, and d represents the approach distance of the magnetic head 3 to the surface of the magnetic disk 1. In order to obtain the approach distance d of the magnetic head 3 to the surface of the magnetic disk 1 using the Wallace equation, the reading outputs $V_n$ and $V_0$ by the reproductive element part 5 are obtained at Steps S1 and S3 mentioned above.

The relationship between the electrical resistance value R of the sensor 7 and the approach distance d of the magnetic head 3 to the surface of the magnetic disk 1 in each stage (at each time of measurement) is experimentally obtained by implementing Steps S1 to S5 explained above.

At Step S4, when it is confirmed from the electrical resistance value R of the sensor 7 that the magnetic head 3 has made contact with the surface of the magnetic disk 1, the approach distance d of the magnetic head 3 to the surface of the magnetic disk 1 from the state where the heater 8 is not activated is obtained (S5), and then, the relationship between the variation dR of the electrical resistance value of the sensor 7 and the flying height SP of the magnetic head 3 (see FIG. 5) is obtained as described later (S6), and this is stored as basic data and the process is stopped.

Herein, the variation dR of the electrical resistance value of the sensor 7 is a variation of the electrical resistance value R when the driving power E of the heater 8 is increased by 10 [mW], and is the difference between the electrical resistance value R obtained at Step S3 and the electrical resistance value R obtained at previous Step S1 or previous Step S3.

Further, if the approach distance d of the magnetic head 3 to the magnetic disk 1 from the state where the heater 8 is not activated, which was obtained at Step S5, is converted using the state where the magnetic head 3 is in contact with the surface of the magnetic disk 1 as an original point (0 [nm]), the flying height (the interval between the magnetic head 3 and the surface of the magnetic disk 1) SP in each measurement state is calculated.

Herein, for a method for calculating the flying height SP from the approach distance d, a specific example is shown. It is assumed that the drastic increase of the electrical resistance value R of the sensor 7 is detected in $N^{th}$ Step S4 and it is confirmed that the magnetic head 3 has come to contact with surface of the magnetic disk 1. If the approach distance obtained at Step S5 up to the $N^{th}$ times is regarded as $d_1, d_2, d_3, d_4, d_5 + \ldots + d_{(N-1)}$ and $d_N$, respectively, the flying height $SP_o$ in the reference state, i.e., in the state where the heater 8 is not driven is $SP_0 = d_1 + d_2 + d_3 + d_4 + d_5 + \ldots + d_{(N-1)} + d_N$. Then, the flying height $SP_1$ at the time when the driving power E to the heater 8 increases once by a predetermined amount (10 [mW]) is $SP_1 = SP_0 - d_1 = d_2 + d_3 + d_4 + d_5 + \ldots + d_{(N-1)} + d_N$. Similarly, the flying height $SP_2$ at the time when the driving power E to the heater 8 increases twice is $SP_2 = SP_0 - d_1 - d_2 = d_3 + d_4 + d_5 + \ldots + d_{(N-1)} + d_N$, and the flying height $SP_3$ at the time when the driving power E to the heater 8 increases three times is $SP_3 = SP_0 - d_1 - d_2 - d_3 = d_4 + d_5, \ldots d_{(N-1)} + d_N$. In other words, the flying height $SP_3$ at the time when the driving power E to the heater 8 increases 'a' times is $SP_a = d_{(a+1)} + d_{(a+2)} + \ldots + d_{(N-1)} + d_N$. However, a<N, and when a≧N, $SP_a = 0$. Furthermore, in the description mentioned above, it was described to obtain the flying height SP in the state before a predetermined amount (10 [mW]) of the driving power E to the heater 8 increases. However, the flying height SP in the state after the driving power E to the heater 7 increases by the predetermined amount (10 [mW]) may be obtained. The flying height SP before the increase of the driving power E can be obtained by calculating based on the variation dR of the electrical resistance value of the sensor 7 before and after the driving power E to the heater 7 increases by the predetermined amount (10 [mW]). Then, the flying height SP after the increase of the driving power E can be obtaining by subtracting the approach distance d of the magnetic head from the flying height SP. Therefore, as described above, it is arbitrarily possible to prepare the basic data (see FIG. 5) on the basis of the flying height SP before the driving power E to the heater 8 increases by a predetermined amount, and to prepare the basic data on the basis of the flying height SP after the driving power E to the heater 8 increases by a predetermined amount.

Thus, at Step S6, the relationship between the variation dR of the electrical resistance value of the sensor 7 and the flying height SP of the magnetic head 3 (see FIG. 5) in each measurement state can be experimentally obtained. It is described in the explanation that in order to facilitate the understanding of the technical concept of the present invention, after the relationship between the driving power E of the heater and the flying height SP of the magnetic head (see FIG. 2), the relationship between the driving power E of the heater and the electrical resistance value R (see FIG. 3) and the relationship between the electrical resistance value R of the sensor and the flying height SP of the magnetic head (see FIG. 4) are obtained, the relationship between the variation dR of the electrical resistance value of the sensor and the flying height SP of the magnetic head (see FIG. 5) is obtained. However, as in the present embodiment, it is also possible to directly obtain the relationship between the variation dR of the electrical resistance value of the sensor 7 and the flying head SP of the magnetic head 3 by way of experiment.

Furthermore, the degree to gradually increase the driving power E of the heater 8 is not limited to 10 [mW], but it is possible to arbitrarily set the degree. If this value is set at smaller, the flying height can be more accurately obtained.

Next, based on the basic data (see FIG. 5) obtained in the initial setting process, a process to obtain an actual flying height of the magnetic head 3 (flying height detecting process) in the present embodiment is explained with reference to the flowchart in FIG. 7. In the present embodiment, when actually writing magnetic information to the magnetic disk 1 or reading magnetic information from the magnetic disk 1 using the magnetic head 3, the flying height SP of the magnetic head 3 can be appropriately obtained. Specifically, first, the electrical resistance value R is obtained in the state where the heater 8 is not driven, i.e., in the state where slider 6 is not thermally expanded (S11).

Then, the driving power E of the heater 8 is increased by a predetermined amount (for example, 10 [mW]) (S12) and the electrical resistance value R of the sensor 7 is obtained (S13). Then, the heater 8 is no longer driven (S14).

Figure 5:
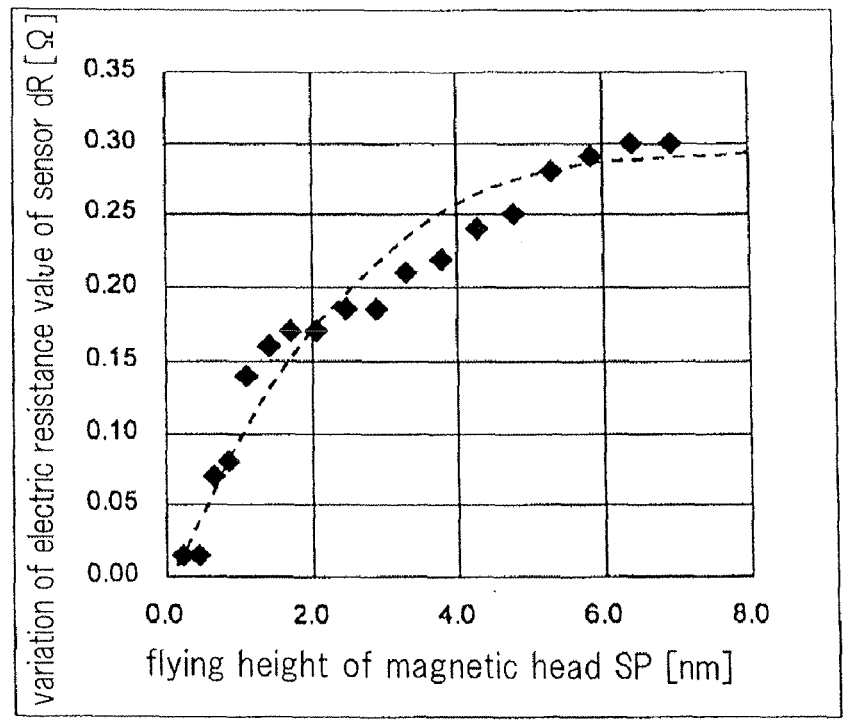
FIG. 5 is a graph showing the relationship between a variation of the electrical resistance value of the sensor and the flying height of the magnetic head.

Herein, the flying height SP of the magnetic head 3 is obtained from the variation dR of the electrical resistance value of the sensor 7, i.e., the difference between the electrical resistance value R obtained at Step S11 and the electrical resistance value R obtained at Step S13, with reference to the basic data shown in the graph of FIG. 5 (S15). This is the flying height SP of the magnetic head 3, i.e., the interval between the magnetic head 3 and the surface of the magnetic disk 1, in the state where the heater 8 is not driven (see FIG. 1A).

When the obtained flying height SP of the magnetic head 3 at the time of not driving the heater is compared with a predetermined acceptable range (a range where there is hardly a possibility where the magnetic head 3 makes contact with the surface of the magnetic disk 1) (S16), if it is within the acceptable range, the process will move on to writing magnetic information to the magnetic disk 1 or reading magnetic information from the magnetic disk even though it is not described in detail.

Then, even in the middle of writing the magnetic information to the magnetic disk or reading the magnetic information from the magnetic disk, the variation dR of the electrical resistance value of the sensor 7 can be continuously monitored, and whether or not the flying height SP of the magnetic head 3 is within the predetermined acceptable range can be continuously checked based on the basic data (see FIG. 5). Further, in the middle of writing the magnetic information to the magnetic disk 1 or reading the magnetic information from the magnetic disk 1, Steps S11 to S16 are appropriately implemented as the occasion demands, and the flying height SP of the magnetic head 3 can be checked.

At Step S16, if the flying height SP of the magnetic head 3 is outside the acceptable range, for example, the magnetic head 3 is coming too close to the magnetic disk 1, and since there is a possibility to cause a failure, such as contact, a warning is issued (S18), and the process is stopped. As described above, according to the present invention, flight can be controlled not to cause damage due to collision of the magnetic head 3 against the magnetic disk 1.

Figure 6:
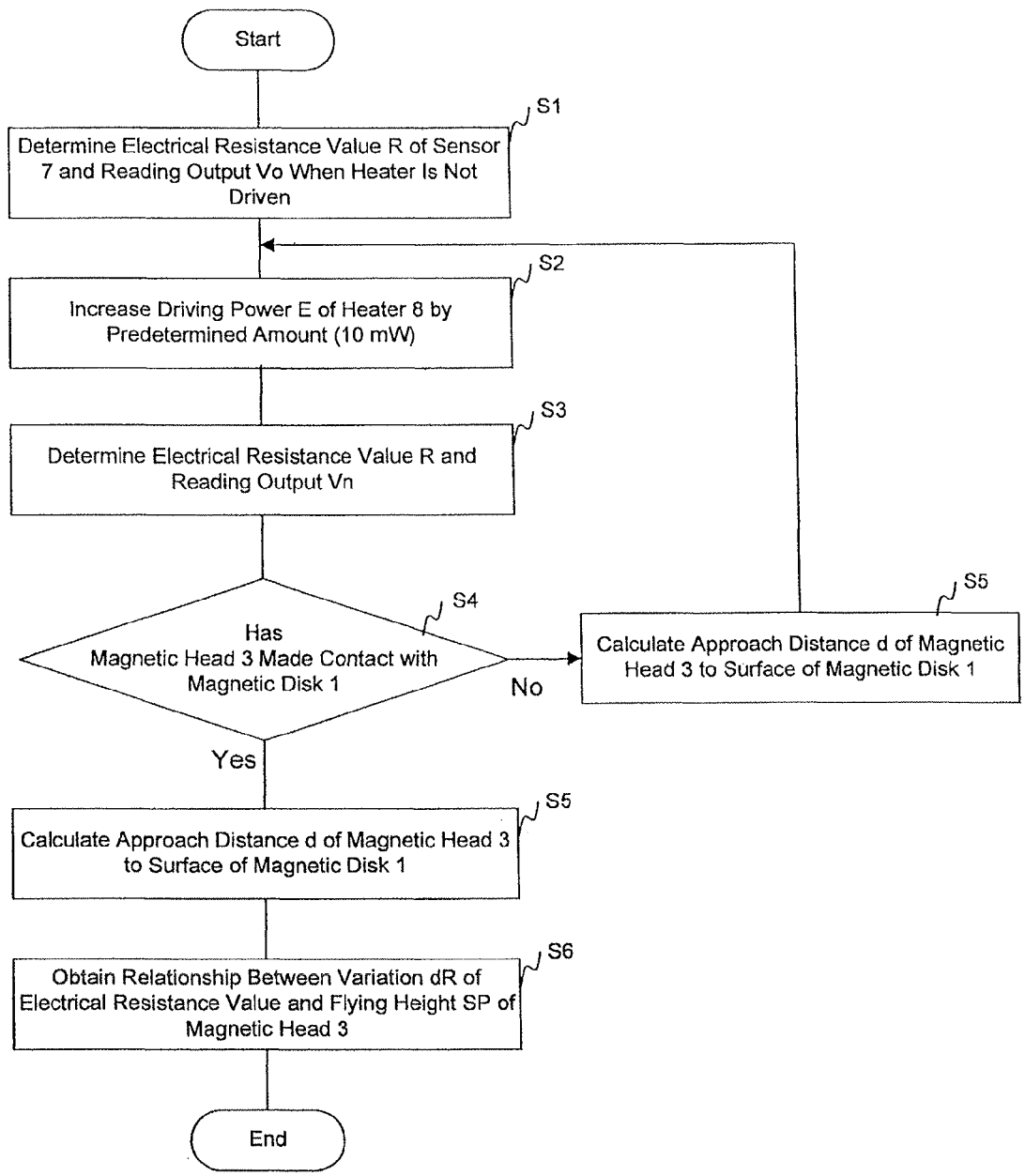
FIG. 6 is a flowchart of the initial setting process in one embodiment of the present invention.
Figure 7:
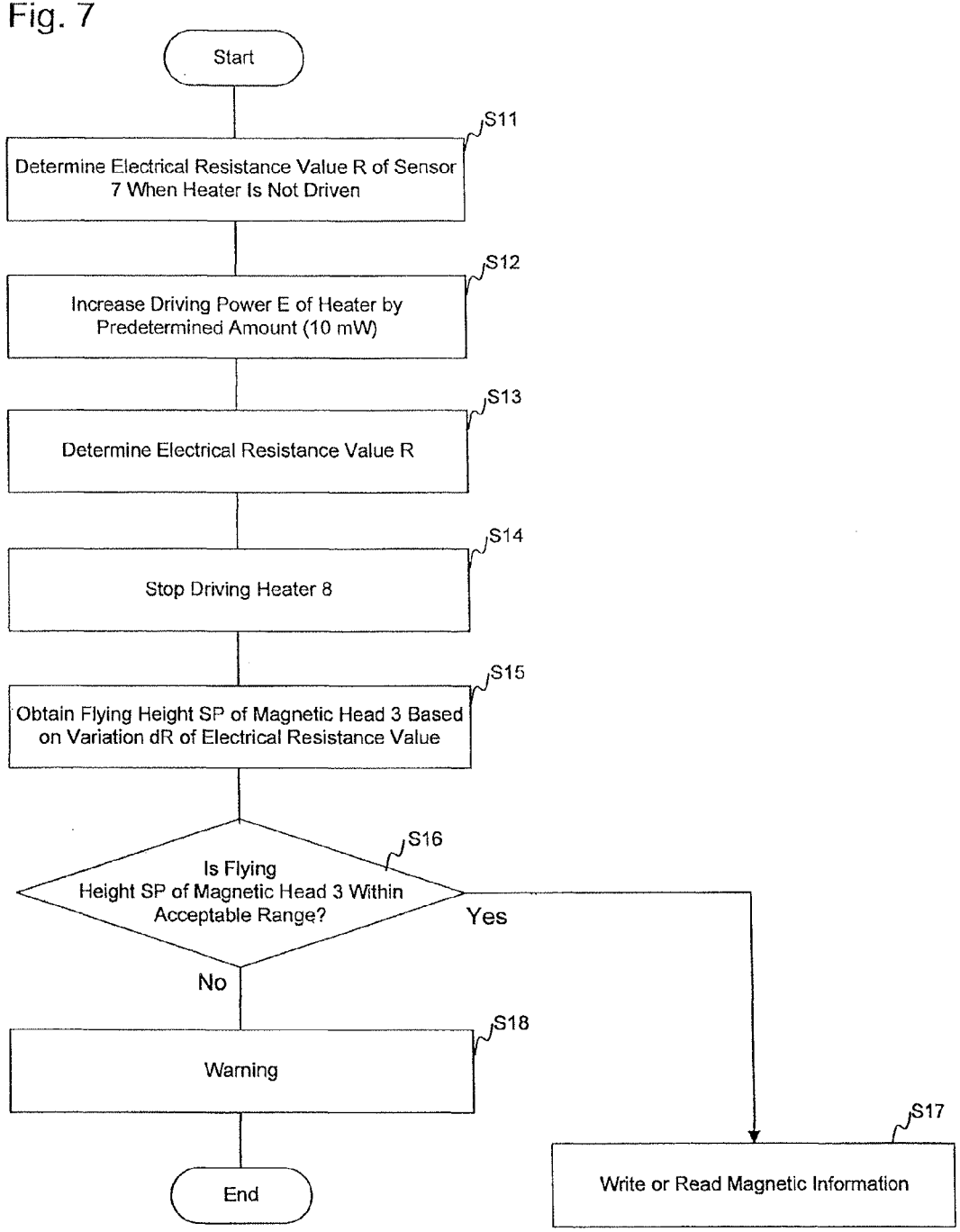
FIG. 7 is a flowchart of the flying height detecting process in one embodiment of the present invention.

As described above, the method of determining the flying height of the magnetic head 3 in the present invention comprises the initial setting process shown in the flowchart of FIG. 6, and the flying height detecting process shown in the flowchart of FIG. 7. As long as the initial setting process shown in the flowchart of FIG. 6 is performed once in one hard disk device, it is unnecessary to repeat the process again. Then, since not the electrical resistance value itself, which is an absolute value, of the sensor 7 but a variation of the electrical resistance value (for example, a variation of the electrical resistance value when the driving power of the heater 8 is increased by 10 [mW]) dR, which is a relative value, is used, as described above, the method can respond to various changes in conditions (for example, a change of the environmental temperature), as well.

Then, when it is necessary to actually obtain the flying height SP of the magnetic head, the flying height detecting process shown in the flowchart of FIG. 7 should be performed, and this flying height detecting process can be repeated at various times. Then, since the flying height detecting process can be simply performed without bringing the magnetic head 3 to contact with the surface of the magnetic disk 1, this will never cause any damage to the magnetic head 3 even if it is performed many times.

In the conventional method, when obtaining the flying height SP of the magnetic head, it is necessary to bring the magnetic head to contact with the surface of the magnetic disk in each case. Therefore, every time it becomes necessary to actually obtain the flying height SP of the magnetic head, bringing the magnetic head to contact with the surface of the magnetic disk is repeated over and over. As a result, it is highly possible to cause damage to the magnetic head. In the meantime, according to the present invention, bringing the magnetic head to contact with the surface of the magnetic disk is performed only once in the initial setting process, and after that, even if the flying height SP of the magnetic head 3 is repeatedly obtained, because the magnetic head 3 will never be brought to contact with the surface of the magnetic disk 1, a risk to cause any damage to the magnetic head 3 is very small.

Further, in the conventional method, the flying height SP of the magnetic head is obtained using the Wallace equation by utilizing the reading outputs $V_n$ and $V_0$ by the reproductive element part of the magnetic head. Therefore, it is necessary to constantly activate the reproductive element part when obtaining the flying height SP of the magnetic head. Further, in order to accurately obtain the reading outputs $V_n$ and $V_0$, as described above, it is necessary to form a specific region for obtaining the flying height on the magnetic disk and to write specific data in that specific region. In other words, the flying height SP of the magnetic head cannot be obtained in the state where a common magnetic disk without such specific region where the specific data for obtaining the flying height is written, is set. In other words, in the conventional method, the flying height SP of the magnetic head cannot be obtained while magnetic information is written to a common magnetic disk or magnetic information is read from a common magnetic disk.

In the meantime, in the present embodiment, in the initial setting process, as similar to the conventional method, because the flying height SP of the magnetic head is obtained by using the reading outputs $V_n$ and $V_0$ by the reproductive element part 5 of the magnetic head 3, it is necessary to use the magnetic disk 1 having a specific region where specific data for obtaining the flying height is written. However, this is a requirement only for the initial setting process, which should be performed only once, and in the process for obtaining the flying height, which is arbitrarily implemented many times after that, since no reading output is used, it is unnecessary to activate the reproductive element part 5 of the magnetic head 3. For example, even if the specific data for obtaining the flying height is erased and the disk is used as a magnetic disk without any record, the flying height SP of the magnetic head 3 can be easily obtained. As described above, according to the present embodiment, even in the middle of writing magnetic information to the magnetic disk 1 or reading magnetic information from the magnetic disk 1, the flying height SP of the magnetic head 3 can be easily obtained at any moment.

In the present invention, the sensor 7 to be used for obtaining the flying height has been widely adopted for detecting the contact between the magnetic head 3 and the surface of the magnetic disk 1 (see US Patent Laid-Open Publication No.

Figure 8:
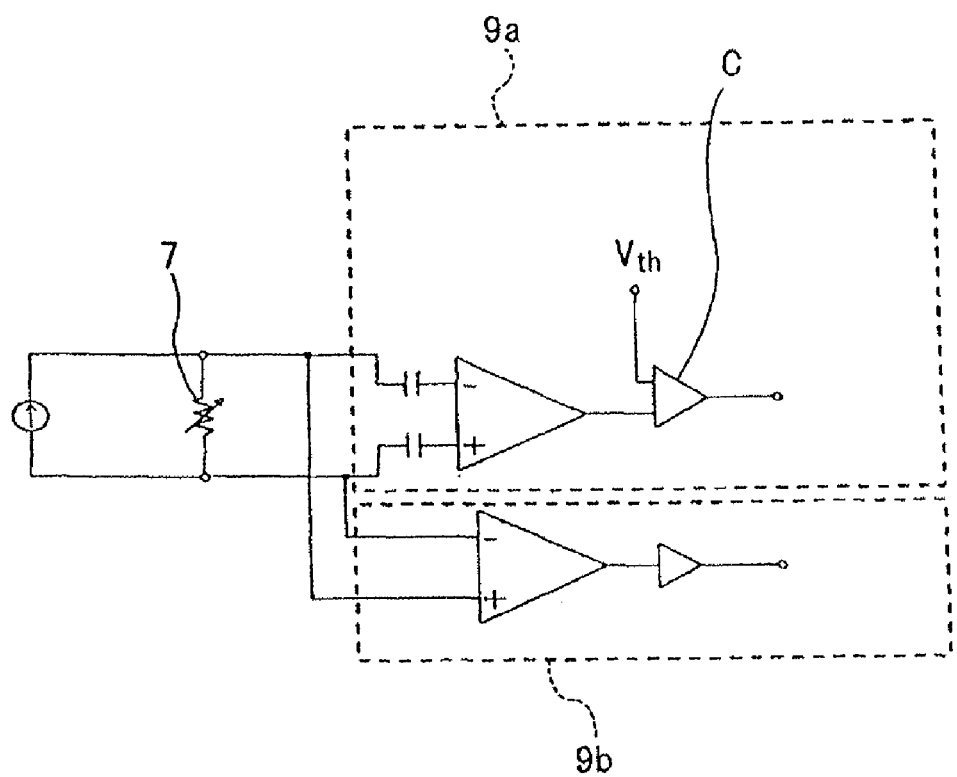
FIG. 8 is a circuit diagram showing a circuit configuration including the sensor in one embodiment of the present invention.

2008/007871). Therefore, it is unnecessary to newly establish a sensor for obtaining the flying height, and a cost increase is prevented. One example of a specific circuit configuration including the sensor 7 is shown in FIG. 8. In this circuit configuration, one of the outputs of the sensor 7 is connected to a comparator C in a circuit portion 9a for the purpose of detecting the contact of the magnetic head with the surface of the magnetic disk 1, and is compared with a threshold value $V_{th}$ for determining whether or not they are in contact. Then, the other output of the sensor 7 is connected to a not-shown controller in a circuit portion 9b for obtaining the flying height SP. Furthermore, the circuit portion 9a has been conventionally established for the purpose of detecting the contact of the magnetic head 3 with the surface of the magnetic disk 1, and the circuit portion 9b is added in the present embodiment. In other words, in the present embodiment, since a new method for obtaining the flying height can be realized by using the sensor 7, which has conventionally been used, and by merely adding a simple additional part to the circuit connected to the sensor 7, a magnetic disk device with high reliability can be realized while cost is kept low.

Furthermore, in the present embodiment, the approach distance d of the magnetic head 3 to the surface of the magnetic disk 1 is obtained using the Wallace equation during the initial setting process. However, the present invention is not limited to this. If the approach distance d of the magnetic head 3 to the surface of the magnetic disk 1 or the flying height SP of the magnetic head 3 from the surface of the magnetic disk 1 can be directly obtained using another method without using the Wallace equation (for example, actual measurement), it is unnecessary to obtain the reading outputs $V_n$ and $V_0$ at Steps S1 and S3 shown in FIG. 2. In that case, the initial setting process can also be performed in the state where a common magnetic disk 1 without specific data for obtaining the flying height and without a specific region is set. Therefore, no specific magnetic disk 1 for obtaining the flying height is required; concurrently, the method for obtaining the flying height relating to the present invention can be implemented even in a magnetic head exclusively for writing without having the reproductive element part 5.

Figure 9:
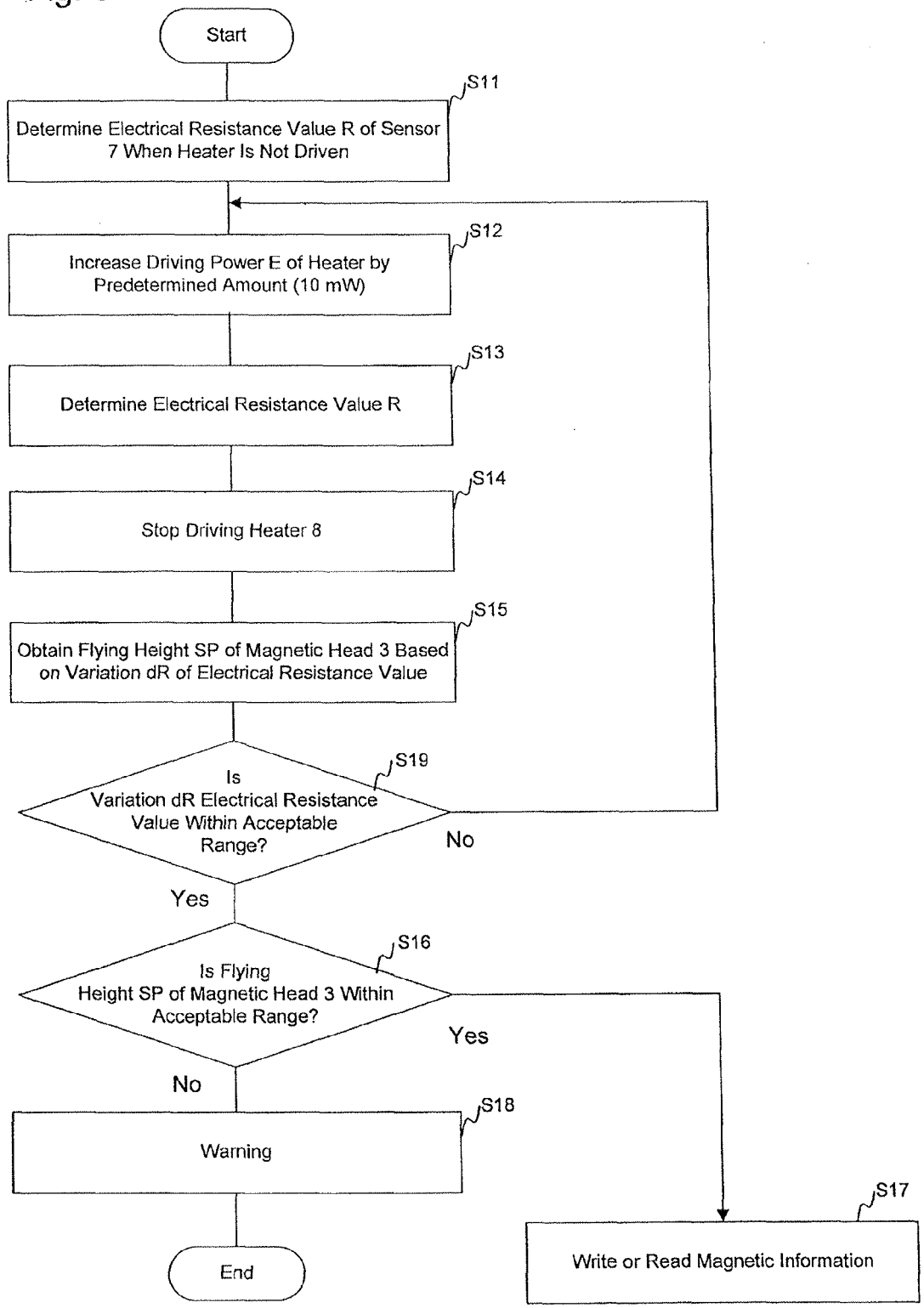
FIG. 9 is a flowchart of another example of the flying height detecting process in one embodiment of the present invention.

Another example of the flying height detecting process of the present invention is shown in FIG. 9. In the flying height detecting process shown in FIG. 9, after the flying height SP of the magnetic head 3 is obtained at Step S15, it is determined whether or not the variation dR of the electrical resistance value is within an appropriate range (S19). At Step S19, when the variation dR of the electrical resistance value is within the appropriate range, as similar to the example shown in FIG. 7, whether or not the flying height SP of the magnetic head 3 at the time of not driving the heater 8 is within a predetermined acceptable range is determined (S16). However, at Step S19, when the variation dR of the electrical resistance value is outside the appropriate range, the driving power E of the heater 8 is increased by a predetermined amount (for example, 10 mW). Then, detecting of the electrical resistance value R of the sensor 7, stopping the driving of the heater 8 and obtaining the flying height SP of the magnetic head 3 (Steps S12 to S15) are repeated. Furthermore, Steps S11-S18 are the same as the embodiment explained with reference to FIG. 7.

Herein, the technical significance of the flying height detecting process shown in FIG. 9 is explained. According to the graph of FIG. 5, the variation dR of the electrical resistance value hardly fluctuates at approximately 0.28Ω within the entire range where the flying height SP of the magnetic head 3 is approximately 5.5 nm or greater. Therefore, when the variation dR of the electrical resistance value obtained at Step S13 is greater than 0.28Ω, even though the flying height SP of the magnetic head 3 is determined as 5.5 nm or greater at Step S15, it is difficult to more precisely obtain the flying height SP. Then, in the flying height detecting process shown in FIG. 9, at Step S19, whether or not the variation dR of the electrical resistance value is within an appropriate range (less 0.28Ω in this example) is checked. Then, when the variation dR is outside this range, the driving power E of the heater 8 is increased until the variation dR of the electrical resistance value is within this range, i.e., until the flying height SP of the magnetic head 3 is unambiguously determined from the variation dR of the electrical resistance value according to the graph in FIG. 5. Thus, when the flying height detecting process shown in FIG. 9 is adopted, the reliability of the flying height detection is increased.

As described with reference to FIG. 5, if the variation dR of the electrical resistance value is within a specified range (for example, in the case of less than 0.28Ω), the flying height SP of the magnetic head 3 can be unambiguously obtained, and the variation dR of the electrical resistance value is outside the range (in the case of 0.28Ω or greater), it is difficult to unambiguously obtain the flying height SP of the magnetic head 3. As described with reference to FIG. 3, the electrical resistance value R of the sensor 7 increases compared to the driving power E and the flying height SP decreases while the driving power E is still small after the heater is driven; however, the increase of the electrical resistance value R of the sensor 7 becomes gradual when the driving power E of the heater 8 becomes great (reaches approximately 30 [mW]). In other words, the electrical resistance value R of the sensor 7 increases linearly in proportion to the driving power E of the heater 8 within the range where the driving power E is small (a range of less than 30 [mW] in the example of FIG. 3), and a rate of increase of the electrical resistance value R, i.e., the variation dR of the electrical resistance value is constant. In this case, the flying height SP of the magnetic head 3 is linearly changed (reduced) in association with the increase of the driving power E of the heater 8 (see FIG. 2). As a result, even though the flying height SP is reduced, the variation dR of the electrical resistance value is substantially constant; thus, it is impossible to obtain the flying height SP of the magnetic head 3 based on the variation dR of the electrical resistance value of the sensor 7. Therefore, the flying height detecting process in the present embodiment is effective within the range where the driving power E of the heater 8 is approximately 30 [mW] or greater. The range expressed with the variation dR of the electrical resistance value (for example, the range of less than 0.28Ω) is an "appropriate range" at Step S19. Furthermore, within the range where the driving power is less than approximately 30 mW (equivalent to the range where the variation dR of the electrical resistance value is 0.28Ω or greater), the interval between the magnetic head 3 and the surface of the magnetic disk 1 is great so as not to cause an air cooling effect due to air flow generated by the rotating magnetic disk 1 affecting the sensor 7. Therefore, the possibility where the magnetic head 3 makes contact with the surface of the magnetic disk 1 is small within the range where the driving power of the heater 8 is less than 30 [mW], and even if this range is excluded from the process to obtain the flying height in the present embodiment, it will not be a practical problem.

As described above, the method for obtaining the flying height in the present embodiment utilizes a phenomenon where the driving power E of the heater 8 and the electrical resistance value R of the sensor 7 are in a nonlinear relationship (see FIG. 3), and by extension, utilizes a phenomenon where the sensor is cooled when the magnetic head 3 is closer to the surface of the magnetic disk 1.

Figure 10:
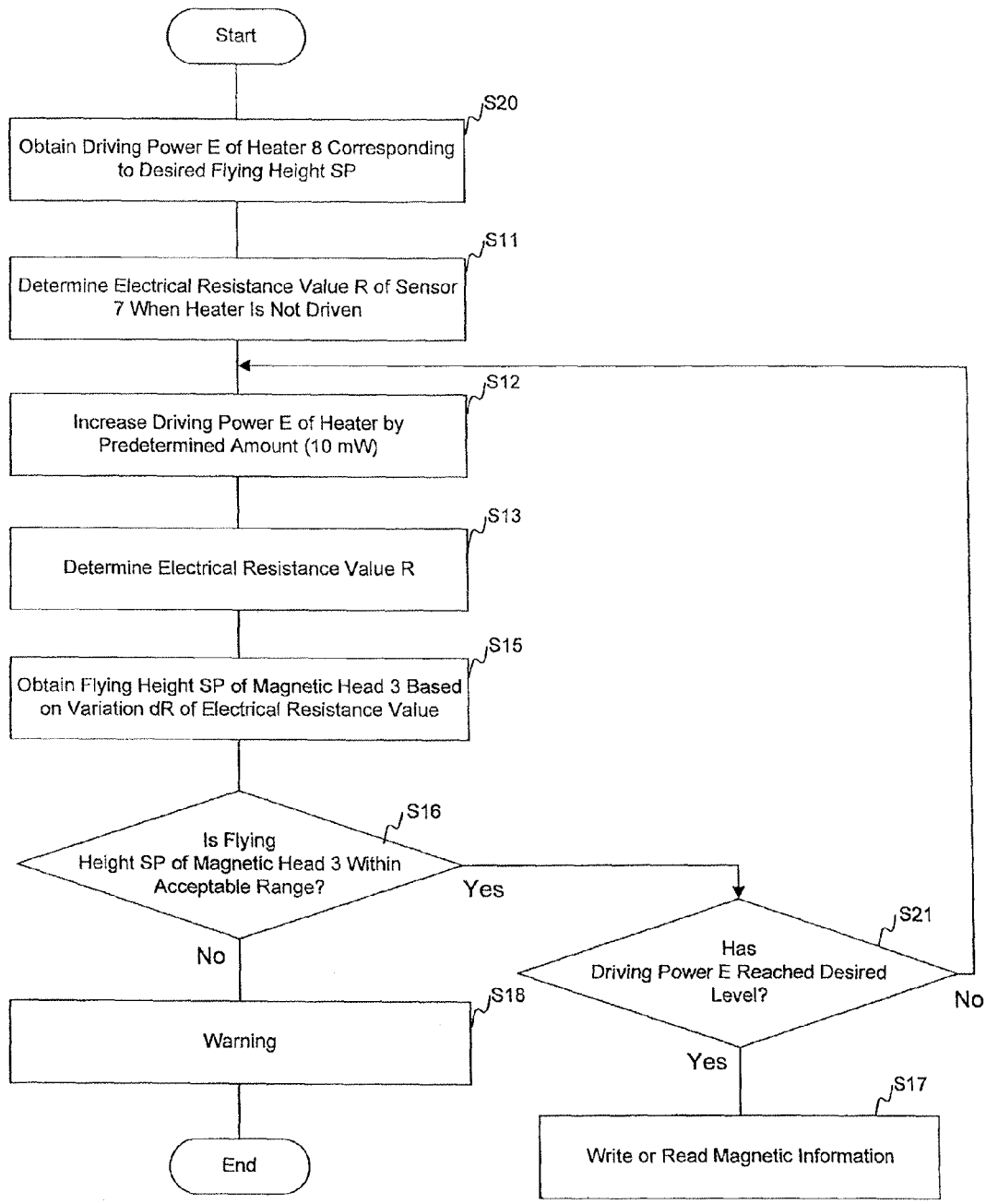
FIG. 10 is a flow chart of another example of the flying height detecting process in one embodiment of the present invention.

Next, another example of the flying height detecting process of the present invention shown in the flowchart of FIG. 10 is explained. In this example, the driving power E of the heater 8 for the purpose of realizing a desired flying height SP of the magnetic head 3 is obtained based on the graph of FIG. 2 (S20). Specifically, for example, the driving power of the heater 8 for setting the flying height SP of the magnetic head 3 at 2.5 [nm] being approximately 50 [mW] is obtained from the relationship shown in FIG. 2.

Then, the electrical resistance value R of the sensor 7 in the state where the heater 8 is not driven is obtained (S11). Then, the driving power E of the heater 8 is increased by a predetermined amount (for example, 10 [mW]) (S12). The electrical resistance value R of the sensor 7 at that time is obtained (S13). The flying height SP of the magnetic head 3 is obtained based on the basic data (the graph shown in FIG. 5) from the variation dR of the electrical resistance value of the sensor 7, which is obtained based on the electrical resistance value R (S15). Whether the flying height SP of the magnetic head 3 obtained as mentioned above is within a predetermined acceptable range is determined (S16). If it is within an acceptable range, whether or not the driving power E of the heater 8 has reached the predetermined value obtained at Step S20 is determined (S21). If the driving power E of the heater 8 has not reached the predetermined value, the driving power E of the heater 8 is increased by a predetermined amount (for example, 10 [mW]) (S12). Then, a process to obtain the electrical resistance value R of the sensor 7 and a process to obtain the flying height SP of the magnetic head 3 from the variation dR of the electrical resistance value, and a process to determine whether or not the flying height SP is within the predetermined acceptable range (Steps S13 and S15) are repeated. Then, at Step S21, if it is confirmed that the driving power E of the heater 8 has reached a predetermined value, after the driving power E is minutely adjusted if necessary, the process moves on to writing of magnetic information to the magnetic disk 1 or reading of magnetic information from the magnetic disk 1 (S17). Then, the electrical resistance value R of the sensor 7 is continuously monitored even in the middle of writing of magnetic information to the magnetic disk 1 or reading of magnetic information from the magnetic disk 1, and the flying height SP of the magnetic head 3 is obtained based on the relationship shown in FIG. 5 from the variation dR of the electrical resistance value, and whether or not the flying height SP is within the acceptable range can be continuously checked.

If the flying height SP of the magnetic head 3 is outside the acceptable range at Step S16, a warning is issued (S18) and the process is stopped.

Furthermore, even in the flying height detecting process shown in FIG. 10, which is similar to the example shown in FIG. 9, Step S19 for checking whether or not the variation dR of the electrical resistance value is within an appropriate acceptable range may be performed.

Theoretically, if the desired flying height SP of the magnetic head 3 is realized by appropriately setting the driving power E of the heater 8 with reference to the data shown in FIG. 2, and the driving power E of the heater 8 is adjusted to be constant, the flying height SP of the magnetic head 3 can be maintained. However, in actuality, the relationship between the driving power E of the heater 8 and the temperature fluctuates due to various environmental factors, and it is not always constant. Therefore, even if the flying height SP of the magnetic head 3 based on the thermal expansion of slider 6 according to temperature, which is assumed from the driving power E of the heater 8, is obtained, there is a possibility that an error is comparatively great. In the meantime, in the method for obtaining the flying height of the present invention, the flying height SP of the magnetic head 3 is obtained by using the variation dR of the electrical resistance value of the sensor 7. A change in the electrical resistance value R of the sensor 7 in association with the temperature change and the thermal expansion of slider 6 according to temperature are computable physical phenomena, and they will never fluctuate due to environmental factors. Therefore, if the flying height SP of the magnetic head 3 is obtained based on the thermal expansion of slider 6 according to the temperature corresponding to the variation dR of the electrical resistance value of the sensor 7, the flying height SP can be always accurately obtained. Therefore, as in the present embodiment, it is extremely effective to obtain the flying height by using not the driving power E of the heater 8 but rather the variation dR of the electrical resistance value of the sensor 7.

The following theory is disclosed in the paper, "Nonlinearity of Thermal Spacing Control in Hard Disk Drives", IEEE TRANSACTION MAGNETICS, VOL. 45, NO. 2, FEBRUARY 2009:

That is, when thermal conductivity of air at room temperature (25° C.) is $k_{air}$, the flying height of the magnetic head 3 (the interval between the magnetic head 3 and the surface of the magnetic disk 1) is SP, pressure on an air bearing surface S (see FIG. 11) of the slider is P, atmospheric pressure is $P_0$, mean free path of air molecule at the atmospheric pressure $P_0$ is $\lambda$, and a heat transfer coefficient h is expressed as $h = k_{air} / \{SP + 2 \cdot \beta \cdot \lambda (P_0/P)\}$. Herein, when a thermal accommodation coefficient is $\sigma$, a specific heat ratio is $\gamma$ and a Prandtl number is $P_r$, $\beta = 2 (2-\sigma) \gamma / \{\sigma(\gamma+1) P_r\}$.

Figure 12:
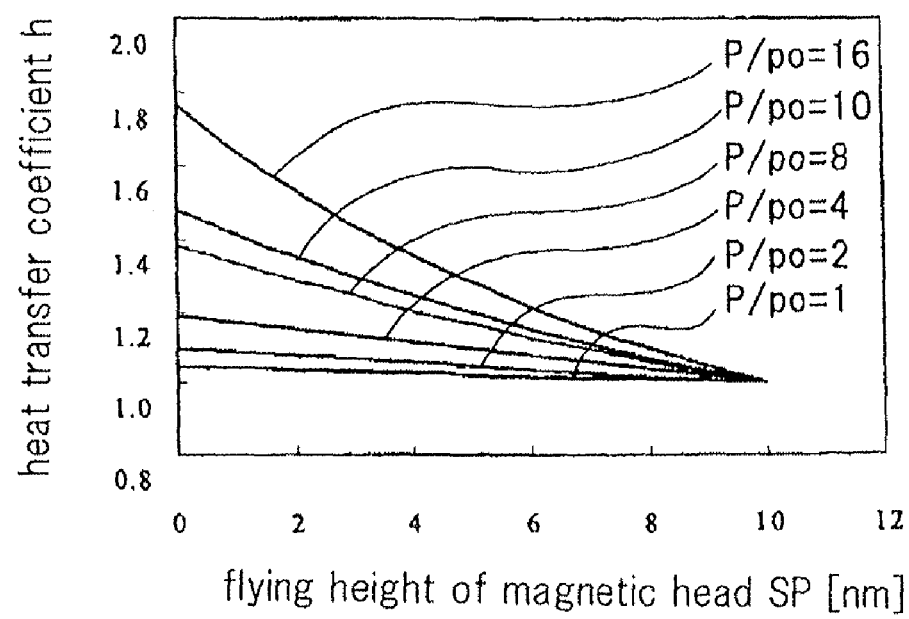
FIG. 12 is a graph showing the relationship between the flying height of the magnetic head and a heat transfer coefficient in various pressure ratios $P/P_o$.

In this equation, if the pressure ratio $P_0/P$ is small, i.e., if the pressure P on the air bearing surface S is great, the heat transfer coefficient h is in substantially inverse proportion to the flying height SP of the magnetic head 3. In other words, the heat transfer coefficient h fluctuates by depending upon the flying height SP of the magnetic head 3 (See FIG. 12). However, if the pressure ratio $P_0/P$ is great, i.e., if the pressure P on the air bearing surface S is small, the heat transfer coefficient h is not influenced by the flying height SP of the magnetic head 3, but depends upon $2 \cdot \rho \cdot \lambda (P_0/P)$. Herein, the value of $2 \cdot \beta \cdot \lambda (P_0/P)$ is substantially constant regardless of the driving power E of the heater as long as the same magnetic head 3 is used. Therefore, if the pressure ratio $P_0/P$ is great, i.e., the pressure P on the air bearing surface S is small, the heat transfer coefficient h is hardly changed.

As described with reference to FIG. 3, the present invention uses a nonlinear relationship between the driving power E of the heater 8 and the electrical resistance value R of the sensor 7. The greater the fluctuation of the heat transfer coefficient h becomes, the more remarkably this nonlinear relationship is expressed. In such a case, when the pressure ratio $P_0/P$ is small, i.e., the pressure P on the air bearing surface S is great, the range where the driving power E of the heater 8 and the electrical resistance value R of the sensor 7 are in a nonlinear relationship becomes wide.

Based on the study mentioned above, the larger the pressure P on the air bearing surface S becomes, the wider the range where the method for obtaining the flying height of the present invention becomes. Specifically, when the pressure P on the air bearing surface S is $4P_0$ or greater (four times or greater of atmospheric pressure), it is believed that the range where the driving power E of the heater 8 and the electrical resistance value R of the sensor 7 are in a nonlinear relationship becomes sufficiently wider.

Figure 11:
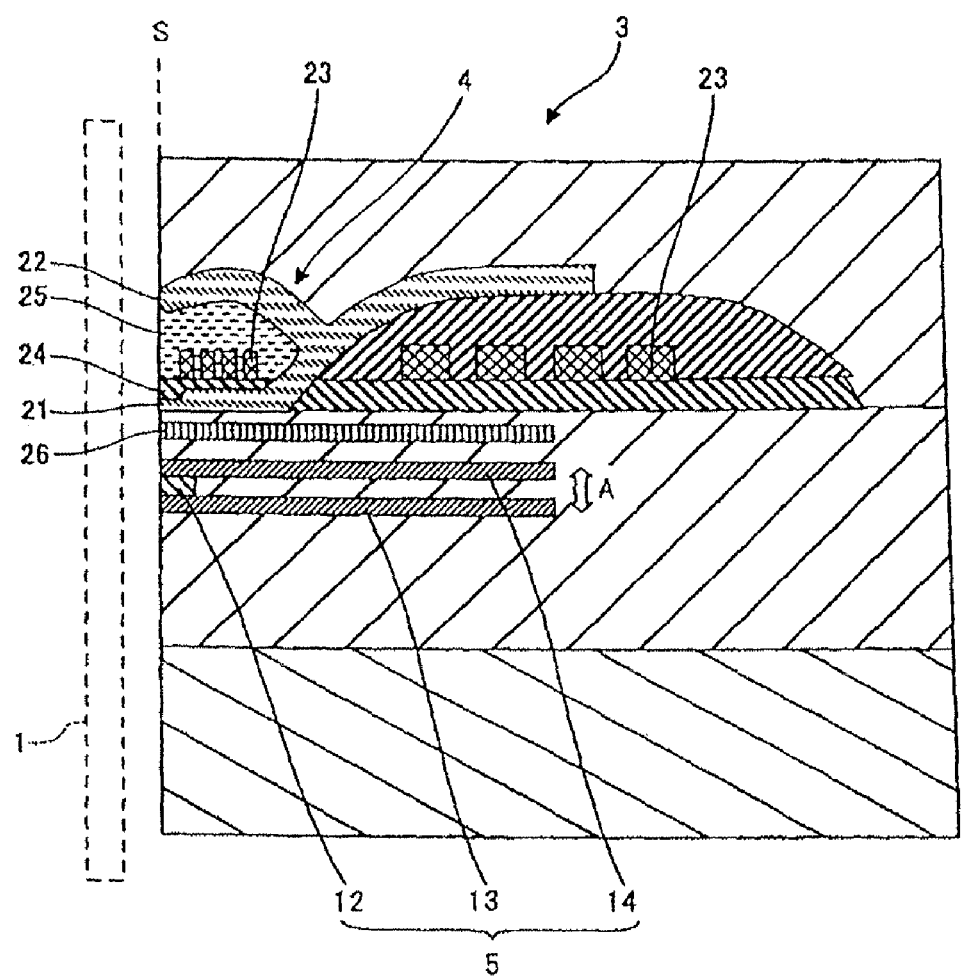
FIG. 11 is a cross sectional view of the magnetic head in one embodiment of the present invention.

An example of the magnetic head 3 to be a subject for the method for obtaining the flying height of the present invention described above is explained hereafter with reference to FIG. 11.

The thin film-state magnetic head 3 in the present embodiment has the recording element part (writing part) 4 and the reproductive element part (reading part) 5. The reproductive element part 5 has a magneto-resistance (MR) element 12, and first and second shield layers 13 and 14 interposing the MR element 12 in the film surface orthogonal direction A of the MR element 12. This is not illustrated, but the MR element 12 includes a pair of magnetic layers and a nonmagnetic intermediate layer interposed by both the magnetic layers. The first shield layer 13 and the second shield layer 14 function as electrodes applying a sensing current in the film surface orthogonal direction A, as well.

The recording element part 4 is placed on the second shield layer 14 via an inter-element shield layer 26 formed using a sputtering method. The recording element part 4 has a so-called vertical magnetic recording configuration. The magnetic pole layer for writing increases a main magnetic pole layer 21 and an auxiliary magnetic pole layer 22. Magnetic pole layers 21 and 22 are formed using a frame plating method or the like. The main magnetic pole layer 21 is made from FeCo, and is exposed in the direction substantially perpendicular to the air bearing surface S, on the air bearing surface S facing the magnetic disk (hard disk) 1, which is a recording medium. A coil layer 23 extending over a gap layer 24 made from an insulating material is wound around the main magnetic pole layer 21, and a magnetic flux is led to the main magnetic pole layer 21 by the coil layer 23. The coil layer 23 is formed using the frame plating method or the like. The magnetic flux is led to the inside of the main magnetic pole layer 21, and is released toward the magnetic disk 1 (see FIGS. 1A and 1B), which is a recording medium, from the air bearing surface S. The main magnetic pole layer 21 is squeezed not only in the film surface orthogonal direction A but also in a track width direction (paper orthogonal direction in FIG. 11) in the vicinity of the air bearing surface S, and a minute and strong writing magnetic field responding to high recording density is generated.

The auxiliary magnetic pole layer 22 is a magnetic layer that is magnetically bound with the main magnetic pole layer 21. The auxiliary magnetic pole layer 22 is a magnetic pole layer formed with an alloy made of any two or three of Ni, Fe and Co with approximately 0.01 μm-approximately 0.5 μm of film thickness. The auxiliary magnetic pole layer 22 is branched from the main magnetic pole layer 21, and faces against the main magnetic pole layer 21 via the gap layer 24 and the coil insulating layer 25 on the air bearing surface S side. Establishment of such auxiliary magnetic pole layer 22 causes more precipitous magnetic field gradient between the auxiliary magnetic pole layer 22 and the main magnetic pole layer 21 in the vicinity of the air bearing surface S. As a result, signal output jitter decreases and the error rate at the time of reading can be reduced.

Figure 13:
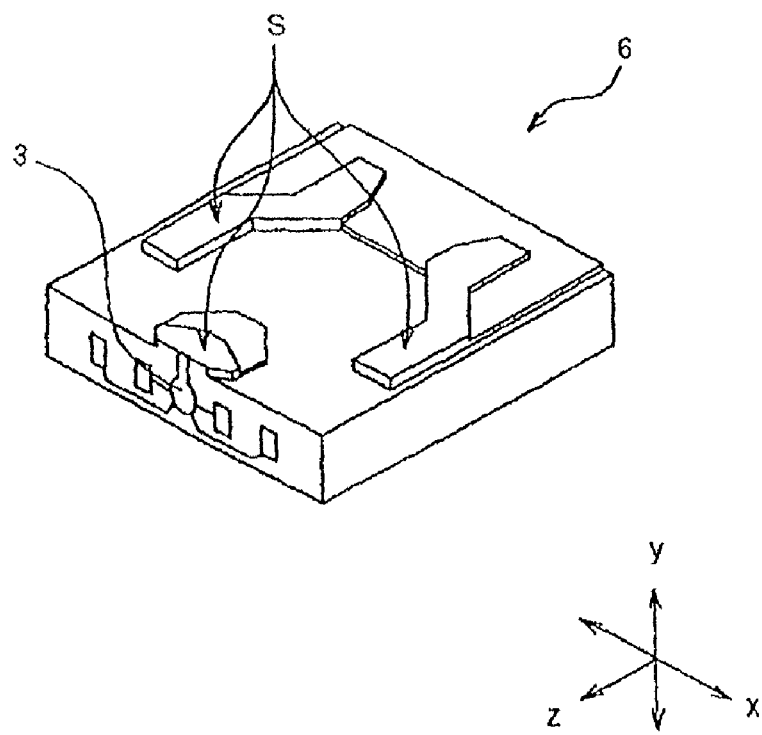
FIG. 13 is a perspective view of a slider in one embodiment of the present invention.

A slider 6 where such magnetic head 3 is formed is shown in FIG. 13. The slider 6 has a substantially hexahedral shape, and one surface of the six is the air bearing surface S facing the magnetic disk 1.

Figure 14:
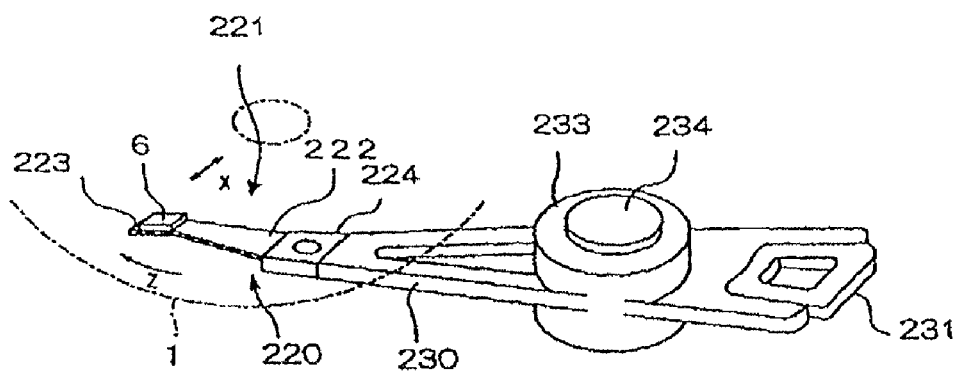
FIG. 14 is a perspective view of a head arm assembly including a head gimbal assembly where the slider of the present invention is incorporated.

As shown in FIG. 14, a head gimbal assembly 220 is equipped with the slider 6, and a suspension 221 elastically supporting the slider 6. The suspension 221 has a plate-spring load beam 222 made from stainless steel, a flexure 223 established at one end of the load beam 222, and a base plate 224 established the other end of the load beam 222. The slider 6 is joined with the flexure 223, and this provides an appropriate degree of freedom to the slider 6. A gimbal part for maintaining the steady posture of the slider 6 is established in the portion of the flexure 223 where the slider 6 is mounted.

The slider 6 is arranged within the hard disk device so as to face against the magnetic disk (hard disk) 1, which is a disk-like recording medium to be rotary-driven. When the magnetic disk 1 rotates in the z direction in FIG. 13, downward lift force in the y direction is generated to the slider 6 due to an aerial flow passing between the magnetic disk 1 and the slider 6. The slider 6 is designed to fly from the surface of the magnetic disk 1 by this lift force. Furthermore, this flying height can be minutely adjusted by using thermal expansion of the slider 6 due to the heat generation of the heater 8 as shown in FIG. 1B. The thin film magnetic head 3 is formed in the vicinity of the end of the slider 6 at the air flow side (the end in the lower left in FIG. 13).

A member where the head gimbal assembly 220 is mounted to an arm 230 is referred to as a head arm assembly 221. The arm 230 moves the slider 6 in the track transverse direction x of the magnetic disk 1. One end of the arm 230 is mounted to a base plate 224. The coil 231, which becomes a portion of the voice coil motor, is mounted to the other end of the arm 230. A bearing part 233 is established in the intermediate portion of the arm 230. The arm 230 is rotatably supported by a shaft 234 mounted to the bearing part 233. The arm 230 and the voice coil motor for driving the arm 230 constitute an actuator.

Figure 15:
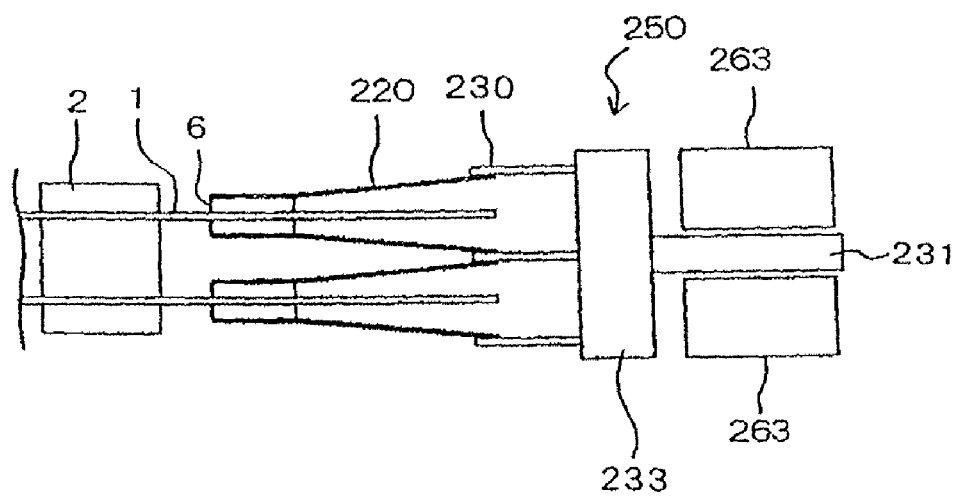
FIG. 15 is a side view of a head arm assembly including the head arm assembly where the slider of the present invention is incorporated.
Figure 16:
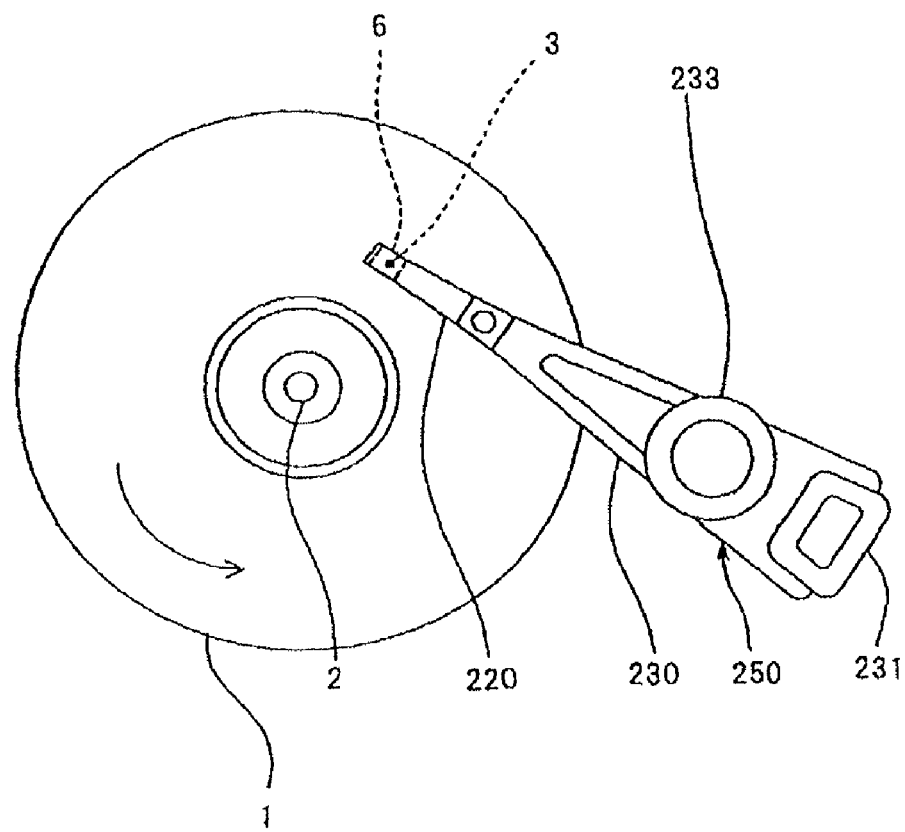
FIG. 16 is a plan view of a hard disk device in which the slider of the present invention is incorporated.

Next, with reference to FIGS. 15 and 16, a head stack assembly where the abovementioned slider 6 is incorporated and the hard disk device are described. The head stack assembly is a member where the head gimbal assembly 220 is mounted to each arm of the carriage having plurality of arms, respectively. FIG. 15 is a side view of the head stack assembly, and FIG. 16 is a plan view of the hard disk device. The head stack assembly 250 has the carriage having a plurality of arms 230. This carriage constitutes the abovementioned bearing part 233. The head gimbal assembly 220 is mounted to each arm 230 so as to vertically align at intervals. A coil 231 to be a portion of the voice coil motor is mounted to an opposite side of the arms 230. The voice coil motor has permanent magnet 263 arranged at the position facing across the coil 231.

With reference to FIG. 16, the head stack assembly 250 is incorporated into the hard disk device. The hard disk device has a plurality of magnetic disks 1 mounted to a spindle motor 2, which is a rotatably supporting mechanism, respectively. Two sliders 6 are arranged so as to face across the magnetic disk 1 for every hard disk 1. The head stack assembly 250 and the actuator excluding slider 6 correspond to a positioning device in the present invention, and support the slider 6; concurrently, position the slider 6 to the magnetic disk 1. The slider 6 is moved in the track transverse direction of the magnetic disk 1 by the actuator, and is positioned relative to the magnetic disk 1. The thin film magnetic head 3 included in the slider 6 records magnetic information to the magnetic disk 1 by the recording element part 4 of the recording head 3, and reproduces the information recorded on the magnetic disk 1 by the reproductive element part 5.

The desirable embodiment of the present invention is proposed and its details are explained. However, these descriptions are exemplification. It should be understood that the present invention is variously modifiable and correctable as long as not departing from the purpose or scope of the attached claims.

What is claimed:

1. A method of determining a flying height of a magnetic head from a magnetic disk, the magnetic head being placed in a slider arranged at an interval with the magnetic disk, the method comprising:
   an initial setting process, including
      gradually increasing driving power to a heater from a state where the heater arranged at a position near the magnetic head in the slider is not driven, until the magnetic head makes contact with the magnetic disk;
      obtaining an electrical resistance value, which increases due to heat from the heater, of the sensor which is arranged at a position near the magnetic head in the slider and at least a portion of which is exposed on an air bearing surface of the slider, and either an approach distance of the magnetic head relative to the magnetic disk or the flying height of the magnetic head from the magnetic disk; and
      preparing basic data by obtaining a relationship between a variation of the electrical resistance value of the sensor and the flying height of the magnetic head from the magnetic disk, the flying height being either obtained by the obtaining step of the initial setting process or calculated based on the obtained approach distance in the obtaining step of the initial setting process, in a range including a state in which the change in the driving power of the heater and the change in the electrical resistance value of the sensor are nonlinear due to the cooling effect caused by rotation of the magnetic disk; and
   a flying height detecting process, including
      determining an electrical resistance value of the sensor; and
      obtaining the flying height of the magnetic head from the magnetic disk in the state where the electrical resistance value of the sensor has been determined, based on the basic data in the range which includes the state in which the change in the driving power of the heater and the change in the electrical resistance value of the sensor are nonlinear which is obtained in the initial setting process, using the variation of the electrical resistance value calculated from the determined value.

2. The method of determining the flying height of the magnetic head according to claim 1, wherein a plurality of iterations of the flying height detecting process are performed after the initial setting process.

3. The method of determining the flying height of the magnetic head according to claim 1, wherein the flying height detecting process is performed in a state where the magnetic head does not make contact with the magnetic disk.

4. A method for controlling a flight of a magnetic head, comprising:
   the initial setting process and the flying height detecting process in the method of determining the flying height of the magnetic head according to claim 1, wherein
   operation of the magnetic head is stopped when the flying height of the magnetic head from the magnetic disk obtained during the flying height detecting process is outside a predetermined acceptable range of the flying height of the magnetic head.

5. A method for controlling a flight of a magnetic head, comprising:
   the initial setting process and the flying height detecting process in the method of determining the flying height of the magnetic head according to claim 1, wherein
   a range of a variation of an electrical resistance value corresponding to a predetermined acceptable range of the flying height of the magnetic head is set in the initial setting process; and
   the electrical resistance value of the sensor is constantly or intermittently determined during the operation of the magnetic head, and the variation of the electrical resistance value obtained from the determined values is compared to the range of the variation of the electrical resistance value corresponding to the acceptable range of the flying height of the magnetic head set in the initial setting process.

6. A method for controlling a flight of a magnetic head, comprising:
   the initial setting process and the flying height detecting process in the method of determining the flying height of a magnetic head according to claim 1, wherein
   the operation of the magnetic head is stopped when the variation of the electrical resistance value obtained from the determined values for the electrical resistance values of the sensor is detected to be outside the range of the variation of the electrical resistance value set in the initial setting process, corresponding to an acceptable range of the flying height of the magnetic head.

7. A method for controlling a flight of a magnetic head, comprising:
   the initial setting process and the flying height detecting process in the method of determining the flying height of a magnetic head according to claim 1, wherein
   pressure, which is at least four times greater than atmospheric pressure, is applied to the air bearing surface facing the magnetic disk of the slider when the magnetic head is operated.

* * * * *